United States Patent
Kawamura et al.

(10) Patent No.: US 6,303,736 B1
(45) Date of Patent: Oct. 16, 2001

(54) ELECTROPHOTOGRAPHIC PHOTOCONDUCTOR AND AROMATIC POLYCARBONATE RESIN FOR USE IN THE PHOTOCONDUCTOR

(75) Inventors: Shinichi Kawamura; Masaomi Sasaki; Kazukiyo Nagai; Chiaki Tanaka; Kohkoku Ri, all of Shizuoka; Susumu Suzuka; Katsuhiro Morooka, both of Kanagawa, all of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/685,903

(22) Filed: Oct. 11, 2000

Related U.S. Application Data

(62) Division of application No. 09/359,736, filed on Jul. 23, 1999, now Pat. No. 6,187,494.

(30) Foreign Application Priority Data

Jul. 24, 1998 (JP) .................................................. 10-209554
Jul. 28, 1998 (JP) .................................................. 10-212637

(51) Int. Cl.⁷ .................................................. C08G 64/00
(52) U.S. Cl. ........................................... 528/196; 528/198
(58) Field of Search ..................................... 528/196, 198

(56) References Cited

U.S. PATENT DOCUMENTS 5,976,746   11/1999   Tanaka et al. ........................ 430/73
6,027,846   2/2000    Shimada et al. ...................... 430/96

Primary Examiner—Terressa M. Boykin
(74) Attorney, Agent, or Firm—Oblon, Spivak, McClelland, Maier & Neustadt, P.C.

(57) ABSTRACT

An electrophotographic photoconductor has an electroconductive support, and a photoconductive layer which is formed thereon and contains an aromatic polycarbonate resin including at least a structural unit of formula (1):

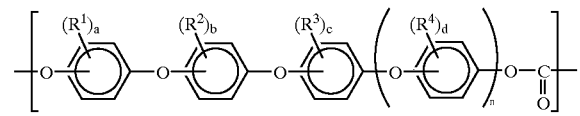

(1)

wherein a, b, c and d are each independently an integer of 0 to 4; n is an integer of 0 or 1; and $R^1$, $R^2$, $R^3$ and $R^4$ are each independently a halogen atom, a substituted or unsubstituted alkyl group having 1 to 6 carbon atoms, a substituted or unsubstituted alkoxyl group having 1 to 6 carbon atoms, or a substituted or unsubstituted aryl group, and $R^1$, $R^2$, $R^3$ and $R^4$ may each be the same or different when a, b, c and d are each an integer of 2, 3 or 4. Further, there are provided aromatic polycarbonate resins each including the structural unit of formula (1) and a structural unit with charge transporting properties.

6 Claims, 5 Drawing Sheets

ELECTROPHOTOGRAPHIC PHOTOCONDUCTOR AND AROMATIC POLYCARBONATE RESIN FOR USE IN THE PHOTOCONDUCTOR

This application is a Division of application Ser. No. 09/359,736 filed on Jul. 23, 1999, now U.S. Pat. No. 6,187,494.

BACKGROUND OF THE INVENTION

1. Field of the Invention

The present invention relates to an electrophotographic photoconductor comprising an electroconductive support and a photoconductive layer formed thereon, comprising an aromatic polycarbonate resin provided with mechanical strength, or both the mechanical strength and charge transporting properties according to the combination of structural units for use in the polycarbonate resin. In addition, the present invention also relates to aromatic polycarbonate resins with charge transporting properties, which are useful as the photoconductive materials for use in the electrophotographic photoconductor and as the materials for use in electronic devices such as organic electroluminescent (EL) device.

2. Discussion of Background

Recently organic photoconductors are used in many copying machines and printers. These organic photoconductors have a layered structure comprising a charge generation layer (CGL) and a charge transport layer (CTL) which are successively overlaid on an electroconductive support. The charge transport layer (CTL) comprises a binder resin and a low-molecular-weight charge transport material (CTM) dissolved therein. The addition of such a low-molecular-weight charge transport material (CTM) to the binder resin lowers the intrinsic mechanical strength of the binder resin, so that the CTL film becomes fragile. Such lowering of the mechanical strength of the CTL causes the wearing of the photoconductor or the formation of scratches and cracks in the surface of the photoconductor.

Although some vinyl polymers such as polyvinyl anthracene, polyvinyl pyrene and poly-N-vinylcarbazole have been studied as high-molecular-weight photoconductive materials for forming a charge transport complex for use in the conventional organic photo-conductor, such polymers are not satisfactory from the viewpoint of photosensitivity.

In addition, high-molecular-weight materials having charge transporting properties have been also studied to eliminate the shortcomings of the above-mentioned layered photoconductor. For instance, there are proposed an acrylic resin having a triphenylamine structure as reported by M. Stolka et al., in "J. Polym. Sci., vol 21, 969 (1983)"; a vinyl polymer having a hydrazone structure as described in "Japan Hard Copy '89 p. 67"; and polycarbonate resins having a triarylamine structure as disclosed in U.S. Pat. Nos. 4,801, 517, 4,806,443, 4,806,444, 4,937,165, 4,959,288, 5,030,532, 5,034,296, and 5,080,989, and Japanese Laid-Open Patent Applications Nos. 64-9964, 3-221522, 2-304456, 4-11627, 4-175337, 4-18371, 4-31404 and 4-133065. However, any materials have not yet been put to practical use.

According to the report of "Physical Review B46 6705 (1992)" by M. A. Abkowitz et al., it is confirmed that the drift mobility of a high-molecular weight charge transport material is lower than that of a low-molecular weight material by one figure. This report is based on the comparison between the photoconductor comprising a low-molecular weight tetraarylbenzidine derivative dispersed in the photoconductive layer and the one comprising a high-molecular polycarbonate having a tetraarylbenzidine structure in its molecule. The reason for this has not been clarified, but it is suggested that the photoconductor employing the high-molecular weight charge transport material produces poor results in terms of the photosensitivity and the residual potential although the mechanical strength of the photoconductor is improved.

Conventionally known representative aromatic polycarbonate resins are obtained by allowing 2,2-bis(4-hydroxyphenyl)propane (hereinafter referred to as bisphenol A) to react with a carbonate precursor material such as phosgene or diphenylcarbonate. Such polycarbonate resins made from bisphenol A are used in many fields because of their excellent characteristics, such as high transparency, high heat resistance, high dimensional accuracy, and high mechanical strength.

For example, this kind of polycarbonate resin is intensively studied as a binder resin for use in an organic photoconductor in the field of electrophotography. A variety of aromatic polycarbonate resins have been proposed as the binder resins for use in the charge transport layer of the layered photoconductor.

As previously mentioned, however, the mechanical strength of the aforementioned aromatic polycarbonate resin is decreased by the addition of the low-molecular-weight charge transport material in the charge transport layer of the layered electrophotographic photoconductor.

In recent years, aromatic polycarbonate resins with excellent sensitivity and electrical characteristics have been found as described in Japanese Laid-Open Patent Application 9-297419. However, at the present stage, those conventional aromatic polycarbonate resins are not always satisfactory in terms of the durability necessary for the electrophotographic photoconductor.

SUMMARY OF THE INVENTION

It is therefore a first object of the present invention to provide an electrophotographic photoconductor free from the conventional shortcomings, which can exhibit high mechanical strength and high durability.

The above-mentioned first object of the present invention can be achieved by an electrophotographic photoconductor comprising an electroconductive support, and a photoconductive layer formed thereon, comprising as an effective component an aromatic polycarbonate resin which comprises a structural unit of formula (1):

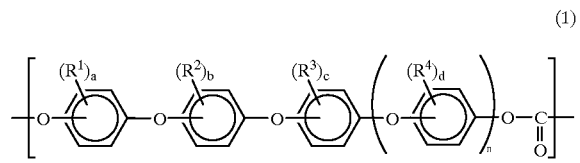

(1)

wherein a, b, c and d are each independently an integer of 0 to 4; n is an integer of 0 or 1; and $R^1$, $R^2$, $R^3$ and $R^4$ are each independently a halogen atom, a substituted or unsubstituted alkyl group having 1 to 6 carbon atoms, a substituted or unsubstituted alkoxyl group having 1 to 6 carbon atoms, or an aryl group which may have a substituent, and $R^1$, $R^2$, $R^3$ and $R^4$ may each be the same or different when a, b, c and d are each an integer of 2, 3 or 4.

In this case, it is preferable that the structural unit of formula (1) be in an amount of 5 wt. % or more of the total weight of the polycarbonate resin.

A second object of the present invention is to provide an electrophotographic photoconductor capable of exhibiting both high mechanical strength and high sensitivity.

The aforementioned second object of the present invention can be achieved by an electrophotographic photoconductor comprising an electroconductive support, and a photoconductive layer formed thereon, comprising as an effective component an aromatic polycarbonate resin which comprises a structural unit of formula (1) and a structural unit having charge transporting properties.

In this case, it is preferable that the structural unit having charge transporting properties be in an amount of 5 wt. % or more, more preferably, in an amount of 10 to 90 wt. %, of the total weight of the aromatic polycarbonate resin.

It is preferable that the aforementioned structural unit having charge transporting properties be represented by the following formula (2):

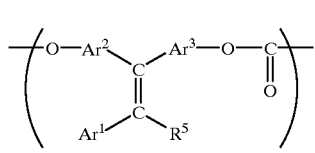

(2)

wherein $R^5$ is a hydrogen atom, an alkyl group which may have a substituent, or an aryl group which may have a substituent; $Ar^1$ is an aryl group which may have a substituent; and $Ar^2$ and $Ar^3$ are each an arylene group which may have a substituent.

The above-mentioned second object of the present invention can be achieved by an electrophotographic photoconductor comprising an electroconductive support, and a photoconductive layer formed thereon, comprising as an effective component an aromatic polycarbonate resin which comprises a repeat unit of formula (3) comprising the previously mentioned structural unit of formula (1) and structural unit of formula (2) having charge transporting properties:

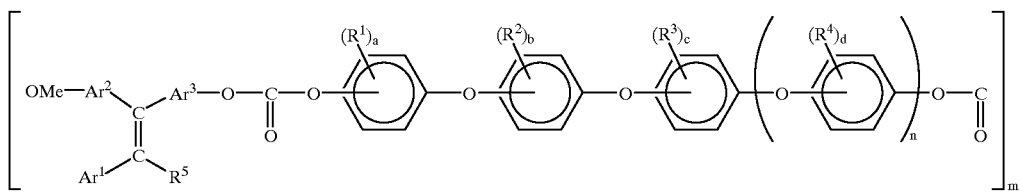

(3)

wherein $R^1$, $R^2$, $R^3$, $R^4$, $R^5$, $Ar^1$, $Ar^2$, $Ar^3$, a, b, c, d, and n are the same as those previously defined; and m is an integer of 2 to 5000, which represents a degree of polymerization.

It is also preferable that the aforementioned structural unit having charge transporting properties, that is used in combination with the structural unit of formula (1), be represented by the following formula (4):

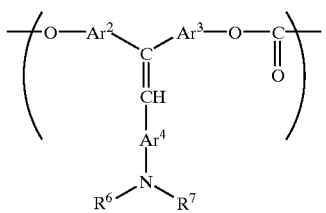

(4)

wherein $Ar^2$ and $Ar^3$ are the same as those previously defined; $Ar^4$ is an arylene group which may have a substituent; and $R^6$ and $R^7$, which may be the same or different, are each an acyl group, an alkyl group which may have a substituent, or an aryl group which may have a substituent.

The second object of the present invention can also be achieved by an electrophotographic photoconductor comprising an electroconductive support, and a photoconductive layer formed thereon, comprising as an effective component an aromatic polycarbonate resin which comprises a repeat unit of formula (5) comprising the previously mentioned structural unit of formula (1) and structural unit of formula (4) having charge transporting properties:

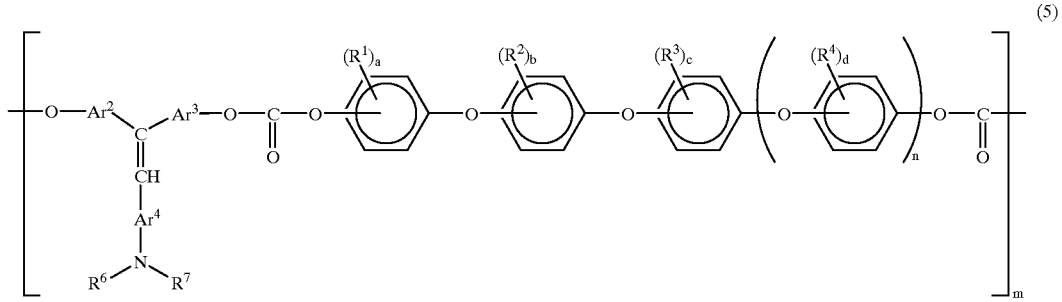

(5)

wherein $R^1$, $R^2$, $R^3$, $R^4$, $R^6$, $R^7$, $Ar^2$, $Ar^3$, $Ar^4$, a, b, c, d, and n are the same as those previously defined; and m is an integer of 2 to 5000, which represents a degree of polymerization.

A third object of the present invention is to provide an aromatic polycarbonate resin that is remarkably useful as a high-molecular-weight charge transport material for use in an organic electrophotographic photoconductor.

The third object of the present invention can be achieved by an aromatic polycarbonate resin comprising a structural unit of formula (1) and a structural unit of formula (2), with the relationship between the composition ratios being $0<k/(k+j)<1$ when the composition ratio of the structural unit of formula (1) is j and that of the structural unit of formula (2) is k:

(1)

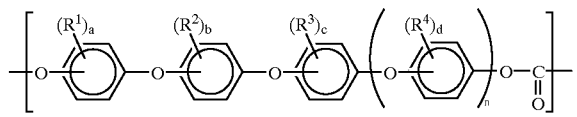

wherein a, b, c and d are each independently an integer of 0 to 4; n is an integer of 0 or 1; and $R^1$, $R^2$, $R^3$ and $R^4$ are each independently a halogen atom, an alkyl group having 1 to 6 carbon atoms, which may have a substituent, an alkoxyl group having 1 to 6 carbon atoms, which may have a substituent, or an aryl group which may have a substituent, and $R^1$, $R^2$, $R^3$ and $R^4$ may each be the same or different when a, b, c and d are each an integer of 2, 3 or 4;

(2)

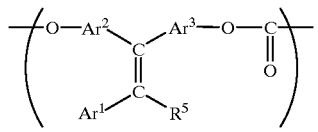

wherein $R^5$ is a hydrogen atom, an alkyl group which may have a substituent, or an aryl group which may have a substituent; $Ar^1$ is an aryl group which may have a substituent; and $Ar^2$ and $Ar^3$ are each an arylene group which may have a substituent.

The third object of the present invention can also be achieved by an aromatic polycarbonate resin comprising a repeat unit of formula (3):

wherein $R^1$, $R^2$, $R^3$, $R^4$, $R^5$, $Ar^1$, $Ar^2$, $Ar^3$, a, b, c, d, and n are the same as those previously defined; and m is an integer of 2 to 5000, which represents a degree of polymerization.

Further, the third object of the present invention can be achieved by an aromatic polycarbonate resin comprising the previously mentioned structural unit of formula (1) and a structural unit of the following formula (4), with the relationship between the composition ratios being $0<k/(k+j)<1$ when the composition ratio of the structural unit of formula (1) is j and that of the structural unit of formula (4) is k:

(4)

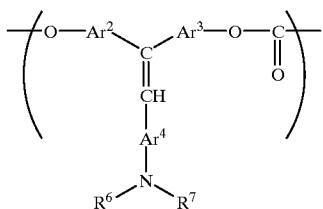

wherein $Ar^2$ and $Ar^3$ are the same as those previously defined; $Ar^4$ is an arylene group which may have a substituent; and $R^6$ and $R^7$, which may be the same or different, are each an acyl group, an alkyl group which may have a substituent, or an aryl group which may have a substituent.

The third object of the present invention can also be achieved by an aromatic polycarbonate resin comprising a repeat unit of formula (5):

(3)

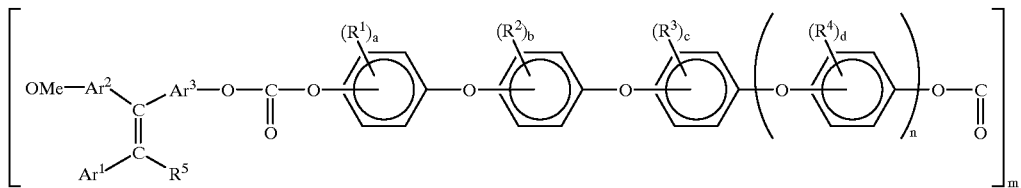

(5)

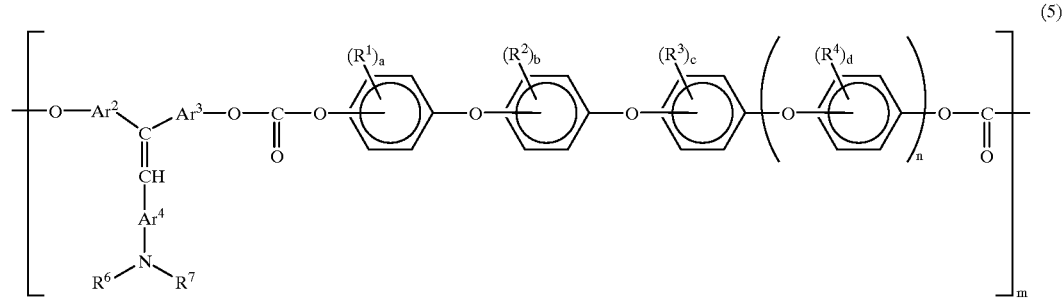

wherein $R^1$, $R^2$, $R^3$, $R^4$, $R^6$, $R^7$, $Ar^2$, $Ar^3$, $Ar^4$, a, b, c, d, and n are the same as those previously defined; and m is an integer of 2 to 5000, which represents a degree of polymerization.

Furthermore, to be more specific, it is preferable that the previously mentioned structural unit of formula (4) be represented by the following formula (6):

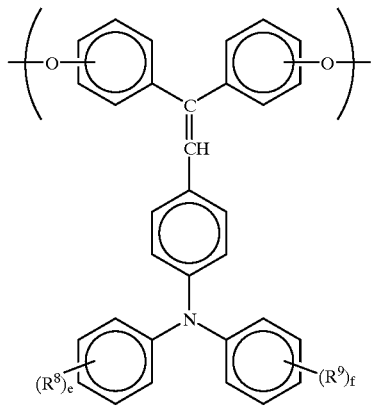

(6)

wherein e and f are each independently an integer of 0 to 5; and $R^8$ and $R^9$ are each independently a halogen atom, an alkyl group having 1 to 6 carbon atoms, which may have a substituent, an alkoxyl group having 1 to 6 carbon atoms, which may have a substituent, or an aryl group which may have a substituent, and $R^8$ and $R^9$ may each be the same or different when e and f are each an integer of 2, 3, 4 or 5.

In addition, it is preferable that the previously mentioned repeat unit of formula (5) be represented by the following formula (7):

FIG. 1 is a schematic cross-sectional view of a first example of an electrophotographic photoconductor according to the present invention.

FIG. 2 is a schematic cross-sectional view of a second example of an electrophotographic photoconductor according to the present invention.

FIG. 3 is a schematic cross-sectional view of a third example of an electrophotographic photoconductor according to the present invention.

FIG. 4 is a schematic cross-sectional view of a fourth example of an electrophotographic photoconductor according to the present invention.

FIG. 5 is a schematic cross-sectional view of a fifth example of an electrophotographic photoconductor according to the present invention.

FIG. 6 is a schematic cross-sectional view of a sixth example of an electrophotographic photoconductor according to the present invention.

FIGS. 7 to 10 are IR spectra of aromatic polycarbonate resins Nos. 1 to 4 according to the present invention (measured from a cast film of each resin on an NaCl plate), respectively synthesized in Preparation Examples 1 to 4.

DESCRIPTION OF THE PREFERRED EMBODIMENTS

The aromatic polycarbonate resin for use in the photoconductive layer of the electrophotographic photoconductor according to the present invention comprises at least a structural unit of formula (1). Alternatively, the aromatic polycarbonate resin is prepared in the form of a copolymer resin comprising the above-mentioned structural unit of formula (1) and a structural unit with charge transporting properties, for example, of formula (2) or (4). Further, according to the present invention, the aromatic polycarbonate resin is prepared in the form of an alternating copolymer resin comprising a repeat unit of formula (3) or (5).

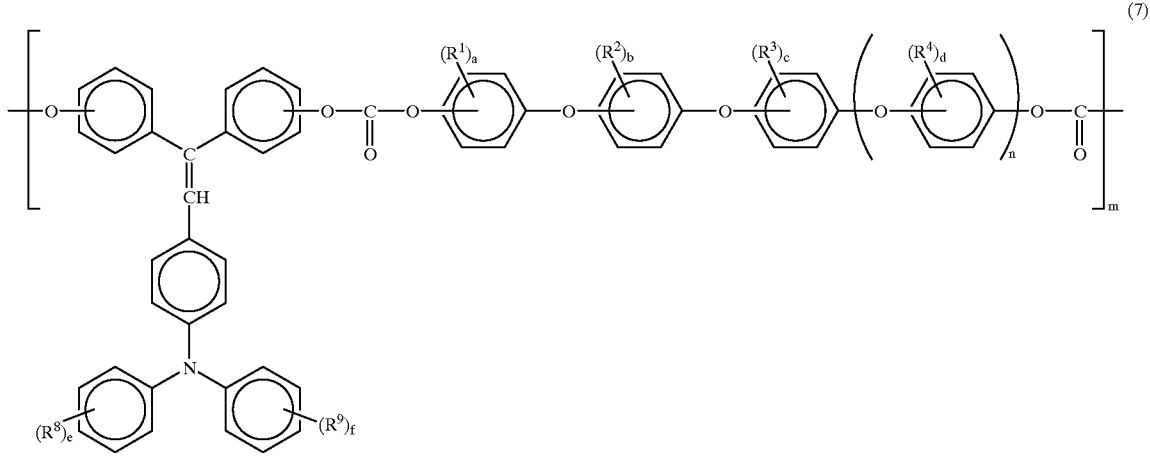

(7)

wherein $R^1$, $R^2$, $R^3$, $R^4$, $R^8$, $R_9$, a, b, c, d, e, f and n are the same as those previously defined; and m is an integer of 2 to 5000, which represents a degree of polymerization.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

The previously mentioned polycarbonate resins in the form of a copolymer resin and an alternating copolymer resin, which are novel compounds, are provided with high mechanical strength and charge transporting properties. Therefore, those aromatic polycarbonate resins are considered to show satisfactory electrical characteristics, optical characteristics, and physical characteristics when used in a photoconductive layer of the electrophotographic photoconductor.

Figure 1:
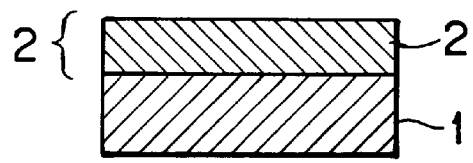

Any of the above-mentioned aromatic polycarbonate resins are provided with high mechanical strength because the structural unit of formula (1) is employed. As a result, the photoconductor of the present invention can shown high durability.

The method of producing the aromatic polycarbonate resin comprising at least the structural unit of formula (1) will now be explained in detail.

The above-mentioned aromatic polycarbonate resin can be obtained by the method of synthesizing a conventional polycarbonate resin, that is, polymerization of a bisphenol and a carbonic acid derivative.

To be more specific, the aromatic polycarbonate resin comprising the structural unit of formula (1) can be produced by the ester interchange between at least one kind of diol represented by the following formula (8) and a bisarylcarbonate compound, or by the polymerization of the diol of formula (8) with a halogenated carbonyl compound such as phosgene in accordance with solution polymerization or interfacial polymerization, or by the polymerization of the diol with a chloroformate such as bischloroformate derived from the diol:

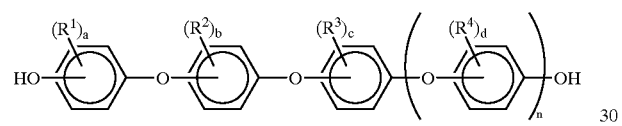

(8)

wherein a, b, c, d, n, $R^1$, $R^2$, $R^3$, and $R^4$ are the same as those previously defined.

In addition to phosgene, trichloromethyl chloroformate that is a dimer of phosgene, and bis(trichloromethyl) carbonate that is a trimer of phosgene are usable as the halogenated carbonyl compounds in the above-mentioned polymerization. Further, halogenated carbonyl compounds derived from other halogen atoms than chlorine, for example, carbonyl bromide, carbonyl iodide and carbonyl fluoride are also employed.

Such conventional synthesis methods are described in the reference, for example, "Handbook of Polycarbonate Resin" (issued by The Nikkan Kogyo Shimbun Ltd.).

The photoconductive layer of the electrophotographic photoconductor according to the present invention may comprise as the effective component an aromatic polycarbonate resin which consists essentially of the structural unit of formula (1). In order to control the mechanical properties, the aromatic polycarbonate resin in the form of a copolymer may be prepared using the structural unit of formula (1) and other structural units. In this case, the structural units for use in the conventional polycarbonate resins, for example, the structural units as described in the previously mentioned reference "Handbook of Polycarbonate Resin" (issued by The Nikkan Kogyo Shimbun Ltd.) can be utilized as the copolymerizable structural units. One of the preferable copolymerizable structural units is a structural unit represented by the following formula (9):

(9)

The starting material for the aforementioned structural unit of formula (9) is represented by the following formula (10):

HO—X—OH (10)

wherein X is a bivalent aliphatic group, a bivalent cyclic aliphatic group, a bivalent aromatic group, a bivalent group prepared by bonding the aforementioned bivalent groups, or a bivalent group selected from the followings:

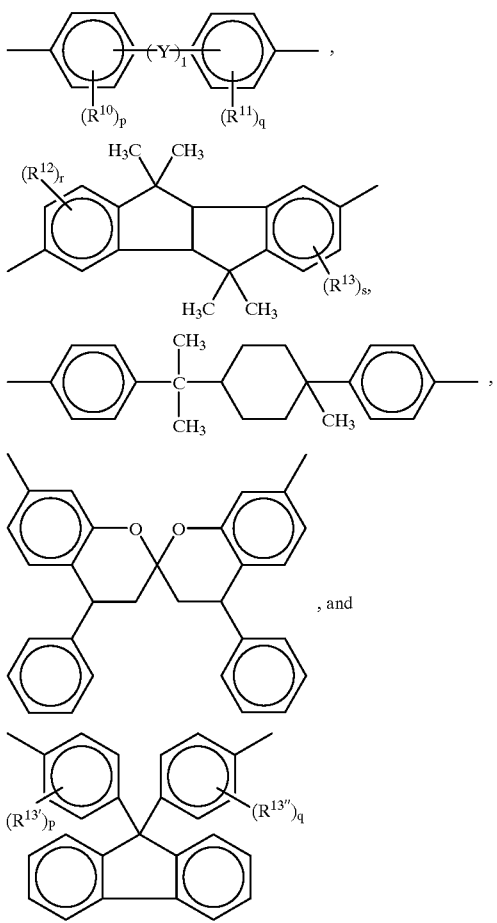

, and in which $R^{10}$, $R^{11}$, $R^{12}$, $R^{13}$, $R^{13'}$, and $R^{13''}$ are each independently an alkyl group which may have a substituent, an aryl group which may have a substituent, or a halogen atom; p and q are each independently an integer of 0 to 4; r and s are each independently an integer of 0 to 3; and l is an integer of 0 or 1, and when l=1, Y is a straight-chain alkylene group having 2 to 12 carbon atoms, a branched alkylene group having 3 to 12 carbon atoms, a bivalent group comprising at least one alkylene group having 1 to 10 carbon atoms and at least one oxygen atom and/or sulfur atom,

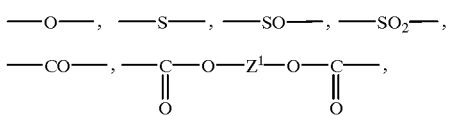

-continued

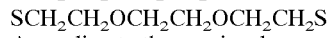
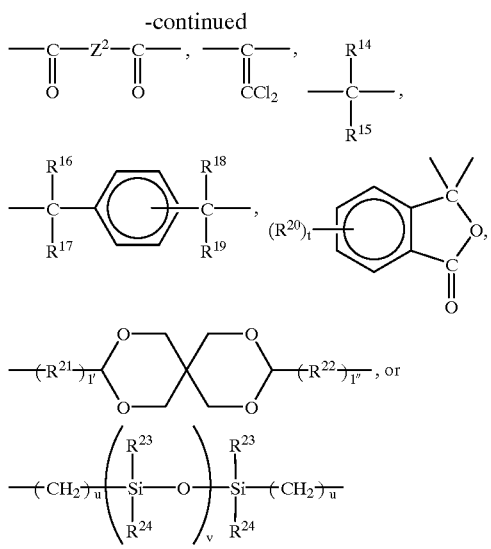

in which $Z^1$ and $Z^2$ are each a substituted or unsubstituted bivalent aliphatic group, or a substituted or unsubstituted arylene group; $R^{14}$, $R^{15}$, $R^{16}$, $R^{17}$, $R^{18}$, $R^{19}$ and $R^{20}$ are each independently a hydrogen atom, a halogen atom, a substituted or unsubstituted alkyl group having 1 to 5 carbon atoms, a substituted or unsubstituted alkoxyl group having 1 to 5 carbon atoms, or a substituted or unsubstituted aryl group, and $R^{14}$ and $R^{15}$ may form together a carbon ring or heterocyclic ring having 5 to 12 carbon atoms or $R^{14}$ and $R^{15}$ may form a carbon ring or heterocyclic ring in combination with $R^{10}$ and $R^{11}$; l' and l" are each an integer of 0 or 1, and when l'=1 and l"=1, $R^{21}$ and $R^{22}$ are each an alkylene group having 1 to 4 carbon atoms; $R^{23}$ and $R^{24}$ are each independently a substituted or unsubstituted alkyl group having 1 to 5 carbon atoms or a substituted or unsubstituted aryl group; t is an integer of 0 to 4; u is an integer of 0 to 20; and v is an integer of 0 to 2000.

When Y is a bivalent group comprising at least one alkylene group having 1 to 10 carbon atoms and at least one oxygen atom and/or sulfur atom, as mentioned above, the following specific examples can be employed:

OCH$_2$CH$_2$O
OCH$_2$CH$_2$OCH$_2$CH$_2$O
OCH$_2$CH$_2$OCH$_2$CH$_2$OCH$_2$CH$_2$O
OCH$_2$CH$_2$CH$_2$O
OCH$_2$CH$_2$CH$_2$CH$_2$O
OCH$_2$CH$_2$CH$_2$CH$_2$CH$_2$CH$_2$O
OCH$_2$CH$_2$CH$_2$CH$_2$CH$_2$CH$_2$CH$_2$CH$_2$O
CH$_2$O
CH$_2$CH$_2$O
CHE$_t$OCHE$_t$
CHCH$_3$O
SCH$_2$OCH$_2$S
CH$_2$OCH$_2$
OCH$_2$OCH$_2$O
SCH$_2$CH$_2$OCH$_2$OCH$_2$CH$_2$S
OCH$_2$CHCH$_3$OCH$_2$CHCH$_3$O
SCH$_2$S
SCH$_2$CH$_2$S
SCH$_2$CH$_2$CH$_2$S
SCH$_2$CH$_2$CH$_2$CH$_2$S
SCH$_2$CH$_2$CH$_2$CH$_2$CH$_2$CH$_2$S
SCH$_2$CH$_2$SCH$_2$CH$_2$S
SCH$_2$CH$_2$OCH$_2$CH$_2$OCH$_2$CH$_2$S

According to the previously mentioned synthesis method, a desired aromatic polycarbonate resin comprising at least one structural unit of formula (1) and at least one structural unit of formula (9) can be provided by freely employing the diol of formula (8) in combination with at least one kind of diol represented by formula (10).

In such a synthesis of the diol of formula (8) and the diol of formula (10), the amount ratio of the diol of formula (8) to the diol of formula (10) may be selected within a wide range in light of the desired characteristics of the obtained aromatic polycarbonate resin. In the present invention, to produce a polycarbonate resin with high mechanical strength, it is preferable that the amount of the structural unit of formula (1) be 5 wt. % or more of the total weight of the produced aromatic polycarbonate resin.

As previously mentioned, there is provided an aromatic polycarbonate resin comprising the structural unit of formula (1) and the structural unit having charge transporting properties, represented by formula (2), (4) or (6), with the relationship between the composition ratios being 0<k/(k+j)<1 when the composition ratio of the structural unit of formula (1) is j and that of the structural unit of formula (2), (4) or (6) is k. By employing such an aromatic polycarbonate resin, the photoconductive layer can be provided with charge transporting properties. To produce such a polycarbonate resin, at least one diol of the previously mentioned formula (8) may be used together with at least one diol with charge transporting properties, represented by the following formula (11), (12) or (13):

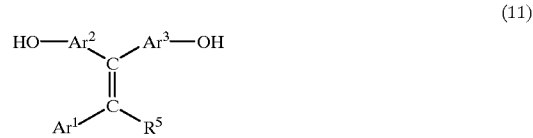

(11)

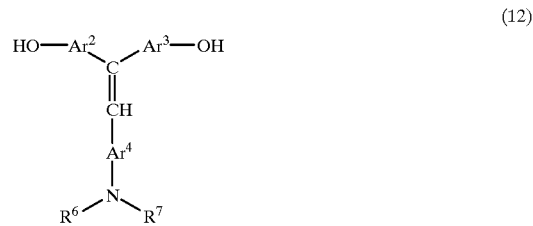

(12)

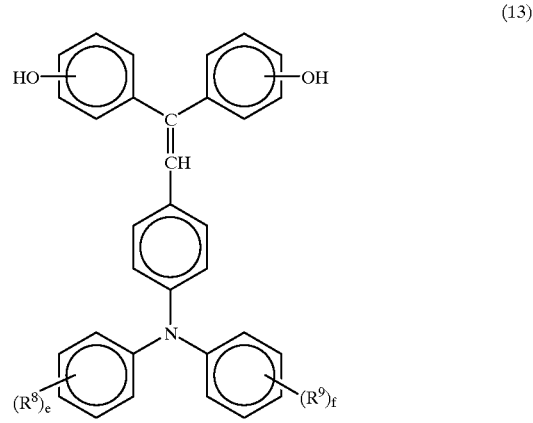

(13)

wherein $Ar^1$, $Ar^2$, $Ar^3$, $Ar^4$, $R^5$, $R^6$, $R^7$, $R^8$, $R^9$, e and f are the same as those as previously defined.

Furthermore, an aromatic polycarbonate resin in the form of a copolymer with improved mechanical properties can be produced by further adding the diol of formula (10) to the diol of formula (8) and at least one diol of formula (11), (12) or (13). In this case, one or a plurality of diols of formula (10) may be used.

In the preparation of the copolymer resin, the amount ratio of the diol with charge transporting properties, represented by formula (11) or (12) and the amount ratio of the diol of formula (8) may be selected within a wide range in light of the desired characteristics of the obtained aromatic polycarbonate resin. In the electrophotographic photoconductor of the present invention, it is preferable that the aromatic polycarbonate resin comprise the structural unit of formula (1) in an amount of 5 wt. % or more, and the structural unit with charge transporting properties in an amount of 5 wt. % or more, more preferably in an amount of 10 to 90 wt. % of the total weight of the produced aromatic polycarbonate resin.

Further, various kinds of copolymers, such as a random copolymer, an alternating copolymer, a block copolymer, a random alternating copolymer, and a random block copolymer can be obtained by appropriately selecting the polymerization procedure.

For instance, a random copolymer comprising the structural unit of formula (1) and the structural unit of formula (2), (4) or (6) can be obtained when the diol of formula (11), (12) or (13) with charge transporting properties and the diol of formula (8) are uniformly mixed prior to the condensation reaction with the phosgene. A random block copolymer can be obtained by the addition of a plurality of diols in the course of the reaction. Further, an alternating copolymer comprising a repeat unit of formula (3), (5) or (7) can be produced by carrying out the condensation reaction of a bischloroformate compound derived from the diol of formula (8) and the diol having charge transporting properties, represented by formula (11), (12) or (13). In such a case, the above-mentioned alternating copolymer comprising a repeat unit of formula (3), (5) or (7) can be similarly produced by carrying out the condensation reaction of a bischloroformate compound derived from the diol of formula (11), (12) or (13) having charge transporting properties and the diol of formula (8). Further, a random alternating copolymer can be produced by employing a plurality of bischloroformate compounds and/or diol compounds in the course of the aforementioned condensation reaction.

The interfacial polymerization is carried out at the interface between two phases of an alkaline aqueous solution of a diol and an organic solvent which is substantially incompatible with water and capable of dissolving a polycarbonate therein in the presence of the carbonic acid derivative and a catalyst. In this case, a polycarbonate resin with a narrow molecular-weight distribution can be speedily obtained by emulsifying the reactive medium through the high-speed stirring operation or addition of an emulsifying material.

As a base for preparing the alkaline aqueous solution of diol, there can be employed an alkali metal and an alkaline earth metal. Specific examples of the base include hydroxides such as sodium hydroxide, potassium hydroxide and calcium hydroxide; and carbonates such as sodium carbonate, potassium carbonate, calcium carbonate and sodium hydrogencarbonate. Those bases may be used alone or in combination. Of those bases, sodium hydroxide and potassium hydroxide are preferable. In addition, distilled water or deionized water are preferably employed for the preparation of the above-mentioned alkaline aqueous solution of diol.

Examples of the organic solvent used in the above-mentioned interfacial polymerization are aliphatic halogenated hydrocarbon solvents such as dichloromethane, 1,2-dichloroethane, 1,2-dichloroethylene, trichloroethane, tetrachloroethane and dichloropropane; aromatic halogenated hydrocarbon solvents such as chlorobenzene and dichlorobenzene; and mixed solvents thereof. Further, aromatic hydrocarbon solvents such as toluene, xylene and ethylbenzene, or aliphatic hydrocarbon solvents such as hexane and cyclohexane may be added to the above-mentioned solvents. The aliphatic halogenated hydrocarbon solvents and aromatic halogenated hydrocarbon solvents are preferable, and in particular, dichloromethane and chlorobenzene are preferably employed in the present invention.

Examples of the catalyst used in the preparation of the polycarbonate resin include a tertiary amine, a quaternary ammonium salt, a tertiary phosphine, a quaternary phosphonium salt, a nitrogen-containing heterocyclic compound and salts thereof, an iminoether and salts thereof, and a compound having amide group.

Specific examples of such catalysts are trimethylamine, triethylamine, tri-n-propylamine, tri-n-hexylamine, N,N,N',N'-tetramethyl-1,4-tetramethylene-diamine, 4-pyrrolidinopyridine, N,N'-dimethylpiperazine, N-ethylpiperidine, benzyltrimethylammonium chloride, benzyltriethylammonium chloride, tetramethylammonium chloride, tetraethylammonium bromide, phenyltriethylammonium chloride, triethylphosphine, triphenylphosphine, diphenylbutylphosphine, tetra(hydroxymethyl) phosphonium chloride, benzyltriethylphosphonium chloride, benzyltriphenylphosphonium chloride, 4-methylpyridine, 1-methylimidazole, 1,2-dimethylimidazole, 3-methylpyridazine, 4,6-dimethylpyrimidine, 1-cyclohexyl-3,5-dimethylpyrazole, and 2,3,5,6-tetramethylpyrazine.

Those catalysts may be used alone or in combination. Of the above-mentioned catalysts, the tertiary amine, in particular, a tertiary amine having 3 to 30 carbon atoms, such as triethylamine is preferably employed in the present invention. Before and/or after the carbonic acid derivatives such as phosgene and bischloroformate are placed in the reaction system, any of the above-mentioned catalysts may be added thereto.

To prevent oxidation of the diol in the alkaline aqueous solution in the course of the polymerization reaction, an antioxidant such as hydrosulfite may be used.

The interfacial polymerization reaction is generally carried out at temperature in the range of 0 to 40° C., and terminated in several minutes to 5 hours. It is desirable to maintain the reaction system to pH 10 or more.

In the case of the solution polymerization, the diol is dissolved in a proper solvent to prepare a solution of the diol, and a deacidifying agent is added thereto. Then, the bischloroformate compound, phosgene or the like is added to the above prepared mixture. In this case, tertiary amine compounds such as trimethylamine, triethylamine and tripropylamine, and pyridine can be used as the deacidifying agents.

Examples of the solvent for use in the above-mentioned solution polymerization are halogenated hydrocarbon solvents such as dichloromethane, dichloroethane, trichloroethane, tetrachloroethane, trichloroethylene, and chloroform; cyclic ethers such as tetrahydrofuran and dioxane; and pyridine.

The reaction temperature is generally in the range of 0 to 40° C. In this case, the solution polymerization is generally terminated in several minutes to 5 hours.

In the case where the polycarbonate resin is synthesized by the ester interchange method, the diol and the bisarylcarbonate are mixed in the presence of an inert gas, and the reaction is carried out at a temperature in the range of 120 to 350° C. under reduced pressure. The pressure in the reaction system is stepwise reduced up to 1 mmHg or less in order to distill away the phenols generated during the reaction from the reaction system. The reaction is commonly terminated in about one to 4 hours. When necessary, the antioxidant may be added to the reaction system. As the bisarylcarbonate compound, diphenyl carbonate, di-p-tolyl carbonate, phenyl-p-tolyl carbonate, di-p-chlorophenyl carbonate and dinaphthyl carbonate can be employed.

To control the molecular weight of the obtained polycarbonate resin, it is desirable to employ a terminator as a molecular weight modifier in any of the above-mentioned polymerization reactions. Consequently, a substituent derived from the terminator may be bonded to the end of the molecule of the obtained polycarbonate resin.

As the terminator for use in the present invention, a monovalent aromatic hydroxy compound and haloformate derivatives thereof, and a monovalent carboxylic acid and halide derivatives thereof can be used alone or in combination.

Specific examples of the monovalent aromatic hydroxy compound are phenols such as phenol, p-cresol, o-ethylphenol, p-ethylphenol, p-isopropylphenol, p-tert-butylphenol, p-cumylphenol, p-cyclohexylphenol, p-octylphenol, p-nonylphenol, 2,4-xylenol, p-methoxyphenol, p-hexyloxyphenol, p-decyloxyphenol, o-chlorophenol, m-chlorophenol, p-chlorophenol, p-bromophenol, pentabromophenol, pentachlorophenol, p-phenylphenol, p-isoprooenylphenol, 2,4-di(1'-methyl-1'-phenylethyl)phenol, β-naphthol, α-naphthol, p-(2',4',4'-trimethylchromanyl)phenol, and 2-(4'-methoxyphenyl)-2-(4"-hydroxyphenyl)propane. In addition, alkali metal salts and alkaline earth metal salts of the above phenols can also be employed. Various haloformate derivatives of the above-mentioned aromatic hydroxy compounds can be used as the terminators.

Specific examples of the monovalent carboxylic acid are aliphatic acids such as acetic acid, propionic acid, butyric acid, valeric acid, caproic acid, heptanic acid, caprylic acid, 2,2-dimethylpropionic acid, 3-methylbutyric acid, 3,3-dimethylbutyric acid, 4-methylvaleric acid, 3,3-dimethylvaleric acid, 4-methylcaproic acid, 3,5-dimethylcaproic acid and phenoxyacetic acid; and benzoic acids such as benzoic acid, p-methylbenzoic acid, p-tert-butylbenzoic acid, p-butoxybenzoic acid, p-octyloxybenzoic acid, p-phenylbenzoic acid, p-benzylbenzoic acid and p-chlorobenzoic acid. In addition, alkali metal salts and alkaline earth metal salts of the above-mentioned aliphatic acids and benzoic acids can also be employed. In addition, various halide derivatives of the above-mentioned monovalent carboxylic acids can be employed as the terminators.

The molecular weight of the obtained aromatic polycarbonate resin can be freely controlled by adding any of the above-mentioned terminators in the course of the polymerization reaction or prior to the polymerization reaction.

Furthermore, the above-mentioned terminator can be used as a protectant for the end group of the molecule of the obtained polycarbonate resin. By the addition of the terminator after completion of the polymerization reaction, the end group of the obtained polycarbonate resin can be protected and provided with various functions.

The above-mentioned terminators may be used alone or in combination. Of those terminators, the monovalent aromatic hydroxy compound is preferable. Preferable examples of the terminators include phenol, p-tert-butylphenol, p-cumylphenol and phenyl chloroformate.

In the present invention, it is preferable that the aromatic polycarbonate resin thus obtained have a number-average molecular weight of 1,000 to 500,000, more preferably in the range of 10,000 to 200,000 when expressed by the styrene-reduced value.

Furthermore, a branching agent may be added in a small amount during the polymerization reaction in order to improve the mechanical properties of the obtained polycarbonate resin. Any compounds that have three or more reactive groups, which may be the same or different, selected from the group consisting of an aromatic hydroxyl group, a haloformate group, a carboxylic acid group, a carboxylic acid halide group, and an active halogen atom can be used as the branching agents for use in the present invention.

Specific examples of the branching agents for use in the present invention are as follows:

phloroglucinol,
4,6-dimethyl-2,4,6-tris(4'-hydroxyphenyl)-2-heptene,
4,6-dimethyl-2,4,6-tris(4'-hydroxyphenyl)heptane,
1,3,5-tris(4'-hydroxyphenyl)benzene,
1,1,1-tris(4'-hydroxyphenyl)ethane,
1,1,2-tris(4'-hydroxyphenyl)propane,
α,α,α'-tris(4'-hydroxyphenyl)-1-ethyl-4-isopropylbenzene,
2,4-bis[α-methyl-α-(4'-hydroxyphenyl)ethyl]phenol,
2-(4'-hydroxyphenyl)-2-(2",4"-dihydroxyphenyl)-propane,
tris(4-hydroxyphenyl)phosphine,
1,1,4,4-tetrakis(4'-hydroxyphenyl)cyclohexane,
2,2-bis[4',4'-bis(4"-hydroxyphenyl)cyclohexyl]-propane,
α,α,α',α'-tetrakis(4'-hydroxyphenyl)-1,4-diethylbenzene,
2,2,5,5-tetrakis(4'-hydroxyphenyl)hexane,
1,1,2,3-tetrakis(4'-hydroxyphenyl)propane,
1,4-bis(4',4"-dihydroxytriphenylmethyl)benzene,
3,3',5,5'-tetrahydroxydiphenyl ether,
3,5-dihydroxybenzoic acid,
3,5-bis(chlorocarbonyloxy)benzoic acid,
4-hydroxyisophthalic acid,
4-chlorocarbonyloxyisophthalic acid,
5-hydroxyphthalic acid,
5-chlorocarbonyloxyphthalic acid,
trimesic trichloride, and
cyanuric chloride.

Those branching agents may be used alone or in combination.

The polycarbonate resin thus synthesized is purified by removing the catalyst and the antioxidant used in the polymerization; unreacted diol and terminator; and impurities such as an inorganic salt generated during the polymerization. Through the above-mentioned purifying procedure, the polycarbonate resin is used in the photoconductive layer of the electrophotographic photoconductor according to the present invention. The previously mentioned "Handbook of Polycarbonate Resin" (issued by Nikkan Kogyo Shimbun Ltd.) can be referred to for such a procedure for purifying the polycarbonate resin.

To the aromatic polycarbonate resin produced by the previously mentioned methods, various additives such as an antioxidant, a light stabilizer, a thermal stabilizer, a lubricant and a plasticizer can be added when necessary.

The structural unit of formula (1), that is the basic structural unit for the preparation of the aromatic polycarbonate resin, will be now explained in detail.

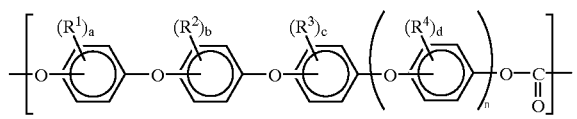
(1)

wherein a, b, c and d are each independently an integer of 0 to 4; n is an integer of 0 or 1; and $R^1$, $R^2$, $R^3$ and $R^4$ are each independently a halogen atom, an alkyl group having 1 to 6 carbon atoms, which may have a substituent, an alkoxyl group having 1 to 6 carbon atoms, which may have a substituent, or an aryl group which may have a substituent, and $R^1$, $R^2$, $R^3$ and $R^4$ may each be the same or different when a, b, c and d are each an integer of 2, 3 or 4.

Examples of the halogen atom represented by $R^1$ to $R^4$ are fluorine atom, chlorine atom, bromine atom, and iodine atom.

The alkyl group represented by $R^1$ to $R^4$ is a straight chain, branched or cyclic alkyl group having 1 to 6 carbon atoms. The alkyl group may have a substituent such as a fluorine atom, cyano group, or a phenyl group which may have a substituent selected from the group consisting of a halogen atom and a straight chain or branched alkyl group having 1 to 5 carbon atoms.

Specific examples of such a substituted or unsubstituted alkyl group are methyl group, ethyl group, n-propyl group, iso-propyl group, t-butyl group, s-butyl group, n-butyl group, iso-butyl group, trifluoromethyl group, 2-cyanoethyl group, benzyl group, 4-chlorobenzyl group, 4-methylbenzyl group, cyclopentyl group, and cyclohexyl group.

Specific examples of the substituted or unsubstituted alkoxyl group represented by $R^1$ to $R^4$ are methoxy group, ethoxy group, n-propoxy group, iso-propoxy group, n-butoxy group, iso-butoxy group, s-butoxy group, t-butoxy group, 2-hydroxyethoxy group, 2-cyanoethoxy group, benzyloxy group, 4-methylbenzyloxy group and trifluoromethoxy group.

Examples of the aryl group represented by $R^1$ to $R^4$ are phenyl group, naphthyl group, biphenylyl group, terphenylyl group, pyrenyl group, fluorenyl group, 9,9-dimethyl-2-fluorenyl group, azulenyl group, anthryl group, triphenylenyl group, chrysenyl group, fluorenylidenephenyl group, 5H-dibenzo[a,d]cyclo-heptenylidenephenyl group, thienyl group, benzothienyl group, furyl group, benzofuranyl group, carbazolyl group, pyridinyl group, pyrrolidyl group, and oxazolyl group.

The above-mentioned aryl group may have a substituent such as the previously mentioned substituted or unsubstituted alkyl group, substituted or unsubstituted alkoxyl group, a halogen atom such as fluorine atom, chlorine atom, bromine atom or iodine atom, or an amino group represented by the following formula:

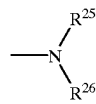

in which $R^{25}$ and $R^{26}$ are each the same substituted or unsubstituted alkyl group or the same substituted or unsubstituted aryl group as defined in the description of $R^1$ to $R^4$, and $R^{25}$ and $R^{26}$ may form a ring together or in combination with a carbon atom of the aryl group to constitute piperidino group, morpholino group or julolidyl group.

Further, specific examples of the compound represented by the previously mentioned formula (8), that is, the starting material for the structural unit of formula (1) are shown below.

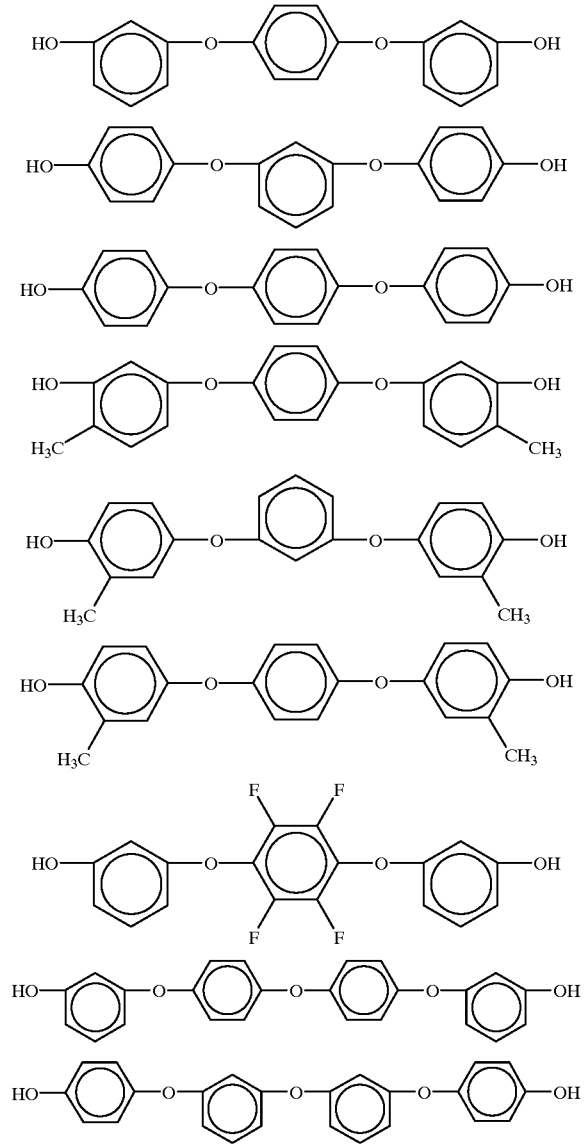

The structural unit of formula (9) will now be explained by referring to the diol of formula (10) that is the starting material for the structural unit of formula (9).

In the case where X in the diol of formula (10) represents a bivalent aliphatic group or a bivalent cyclic aliphatic group, the representative examples of the obtained diol are as follows: ethylene glycol, diethylene glycol, triethylene glycol, polyethylene glycol, polytetramethylene ether glycol, 1,3-propanediol, 1,4-butanediol, 1,5-pentanediol, 3-methyl-1,5-pentanediol, 1,6-hexanediol, 1,5-hexanediol, 1,7-heptanediol, 1,8-octanediol, 1,9-nonanediol, 1,10-decanediol, 1,11-undecanediol, 1,12-dodecanediol, neopentyl glycol, 2-ethyl-1,6-hexanediol, 2-methyl-1,3-propanediol, 2-ethyl-1,3-propanediol, 2,2-dimethyl-1,3-propanediol, 1,3-cyclohexanediol, 1,4-cyclohexanediol, cyclohexane-1,4-dimethanol, 2,2-bis(4-hydroxycyclohexyl) propane, xylylenediol, 1,4-bis(2-hydroxyethyl)benzene, 1,4-bis(3-hydroxypropyl)benzene, 1,4-bis(4-hydroxybutyl) benzene, 1,4-bis(5-hydroxypentyl)benzene, and 1,4-bis(6-hydroxyhexyl)benzene.

In the case where X in the diol of formula (10) represents a bivalent aromatic group, there can be employed any bivalent groups derived from the same substituted or unsubstituted aryl group as defined in the description of $R^1$ to $R^4$.

In addition, X represents a bivalent group selected from the following groups:

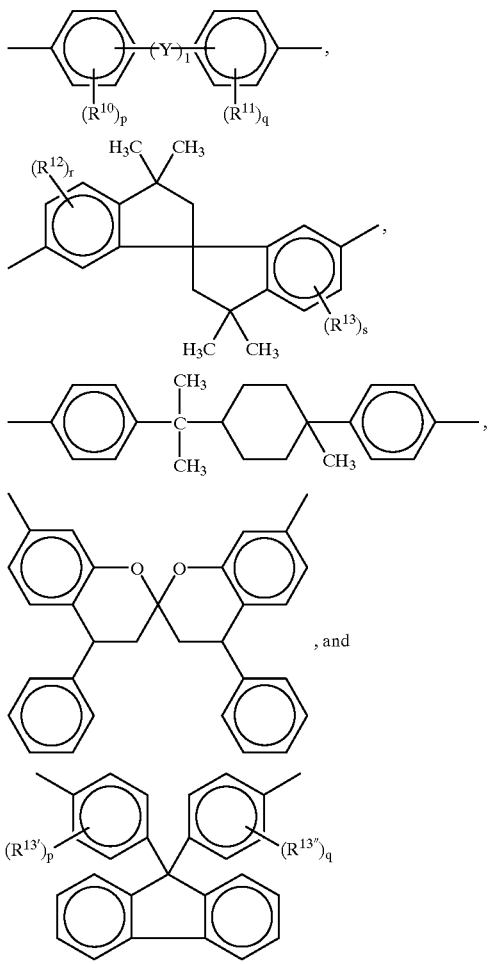

wherein $R^{10}$, $R^{11}$, $R^{12}$, $R^{13}$, $R^{13'}$, and $R^{13''}$ are each independently an alkyl group which may have a substituent, an aryl group which may have a substituent, or a halogen atom; p and q are each independently an integer of 0 to 4; r and s are each independently an integer of 0 to 3; and l is an integer of 0 or 1, and when l=1, Y is a straight-chain alkylene group having 2 to 12 carbon atoms, a branched alkylene group having 3 to 12 carbon atoms, a bivalent group comprising at least one alkylene group having 1 to 10 carbon atoms and at least one oxygen atom and/or sulfur atom,

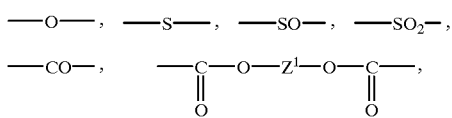

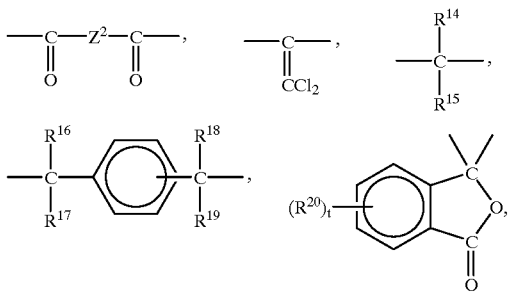

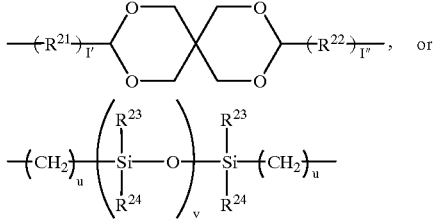

in which $Z^1$ and $Z^2$ are each a substituted or unsubstituted bivalent aliphatic group, or a substituted or unsubstituted arylene group; $R^{14}$, $R^{15}$, $R^{16}$, $R^{17}$, $R^{18}$, $R^{19}$ and $R^{20}$ are each independently a hydrogen atom, a halogen atom, a substituted or unsubstituted alkyl group having 1 to 5 carbon atoms, a substituted or unsubstituted alkoxyl group having 1 to 5 carbon atoms, or a substituted or unsubstituted aryl group, and $R^{14}$ and $R^{15}$ may form together a carbon ring or heterocyclic ring having 5 to 12 carbon atoms or $R^{14}$ and $R^{13}$ may form a carbon ring or heterocyclic ring in combination with $R^{10}$ and $R^{11}$; l' and l'' are each an integer of 0 or 1, and when l'=1 and l''=1, $R^{21}$ and $R^{22}$ are each an alkylene group having 1 to 4 carbon atoms; $R^{23}$ and $R^{24}$ are each independently a substituted or unsubstituted alkyl group having 1 to 5 carbon atoms or a substituted or unsubstituted aryl group; t is an integer of 0 to 4;

u is an integer of 0 to 20; and v is an integer of 0 to 2000.

In the above-mentioned bivalent groups, the same substituted or unsubstituted alkyl group, and the same substituted or unsubstituted aryl group as defined in the description of $R^1$ to $R^4$ can be employed for $R^{10}$ to $R^{20}$ and $R^{23}$ and $R^{24}$.

Examples of a halogen atom represented by $R^{10}$ to $R^{20}$ are a fluorine atom, a chlorine atom, a bromine atom and an iodine atom.

When $Z^1$ and $Z^2$ each represent a substituted or unsubstituted bivalent aliphatic group, there can be employed any bivalent groups obtained by removing the hydroxyl groups from the diol of formula (10) in which X represents a bivalent aliphatic group or a bivalent cyclic aliphatic group. On the other hand, when $Z^1$ and $Z^2$ each represent a substituted or unsubstituted arylene group, there can be employed any bivalent groups derived from the substituted or unsubstituted aryl group as defined in the description of $R^1$ to $R^4$.

Preferable examples of the diol of formula (10) in which X represents a bivalent aromatic group are as follows:
bis(4-hydroxyphenyl)methane,
bis(2-methyl-4-hydroxyphenyl)methane,
bis(3-methyl-4-hydroxyphenyl)methane,
1,1-bis(4-hydroxyphenyl)ethane,
1,2-bis(4-hydroxyphenyl)ethane,
bis(4-hydroxyphenyl)phenylmethane,
bis(4-hydroxyphenyl)diphenylmethane, 1,1-bis(4-hydroxyphenyl)-1-phenylethane,
1,3-bis (4-hydroxyphenyl)-1,1-dimethylpropane,
2,2-bis(4-hydroxyphenyl)propane,
2-(4-hydroxyphenyl)-2-(3-hydroxyphenyl)propane,
1,1-bis(4-hydroxyphenyl)-2-methylpropane,
2,2-bis(4-hydroxyphenyl)butane,
1,1-bis(4-hydroxyphenyl)-3-methylbutane,
2,2-bis(4-hydroxyphenyl)pentane,
2,2-bis(4-hydroxyphenyl)-4-methylpentane,
2,2-bis(4-hydroxyphenyl)hexane,
4,4-bis(4-hydroxyphenyl)heptane,
2,2-bis(4-hydroxyphenyl)nonane,
bis(3,5-dimethyl-4-hydroxyphenyl)methane,
2,2-bis(3-methyl-4-hydroxyphenyl)propane,
2,2-bis(3-isopropyl-4-hydroxyphenyl)propane,
2,2-bis(3-sec-butyl-4-hydroxyphenyl)propane,
2,2-bis(3-tert-butyl-4-hydroxyphenyl)propane,
2,2-bis(3-cyclohexyl-4-hydroxyphenyl)propane,
2,2-bis(3-allyl-4-hydroxyphenyl)propane,
2,2-bis(3-phenyl-4-hydroxyphenyl)propane,
2,2-bis(3,5-dimethyl-4-hydroxyphenyl)propane,
2,2-bis(3-chloro-4-hydroxyphenyl)propane,
2,2-bis(3,5-dichloro-4-hydroxyphenyl)propane,
2,2-bis(3-bromo-4-hydroxyphenyl)propane,
2,2-bis(3,5-dibromo-4-hydroxyphenyl)propane,
2,2-bis(4-hydroxyphenyl)hexafluoropropane,
1,1-bis(4 -hydroxyphenyl)cyclopentane,
1,1-bis(4-hydroxyphenyl)cyclohexane,
1,1-bis(3-methyl-4-hydroxyphenyl)cyclohexane,
1,1-bis(3,5-dimethyl-4-hydroxyphenyl)cyclohexane,
1,1-bis(3,5-dichloro-4-hydroxyphenyl)cyclohexane,
1,1-bis(4-hydroxyphenyl)-3,3,5-trimethylcyclohexane,
1,1-bis(4-hydroxyphenyl)cycloheptane,
2,2-bis(4-hydroxyphenyl)norbornane,
2,2-bis(4-hydroxyphenyl)adamantane,
4,4'-dihydroxydiphenyl ether,
4,4'-dihydroxy-3,3'-dimethyldiphenyl ether,
ethylene glycol bis(4-hydroxyphenyl)ether,
4,4'-dihydroxydiphenylsulfide,
3,3'-dimethyl-4,4'-dihydroxydiphenylsulfide,
3,3',5,5'-tetramethyl-4,4'-dihydroxydiphenylsulfide,
4,4'-dihydroxydiphenylsulfoxide,
3,3'-dimethyl-4,4'-dihydroxydiphenylsulfoxide,
4,4'-dihydroxydiphenylsulfone,
3,3'-dihyhydroxydiphenylsulfone,
3,3'-diphenyl-4,4'-dihydroxydiphenylsulfone,
3,3'-dichloro-4,4'-dihydroxydiphenylsulfone,
bis(4-hydroxyphenyl)ketone,
bis(3-methyl-4-hydroxyphenyl)ketone,
3,3,3',3'-tetramethyl-6,6'-dihydroxyspiro(bis)-indane,
3,3',4,4'-tetrahydro-4,4,4',4'-tetramethyl-2,2'-spirobi(2H-1-benzopyrane)-7,7'-diol,
trans-2,3-bis(4-hydroxyphenyl)-2-butene,
9,9-bis(4-hydroxyphenyl)fluorene,
9,9-bis(4-hydroxyphenyl)xanthene,
1,6-bis(4-hydroxyphenyl)-1,6-hexanedione,
α,α,α',α'-tetramethyl-α,α'-bis(4-hydroxyphenyl)-p-xylene,
α,α,α',α'-tetramethyl-α,α'-bis(4-hydroxyphenyl)-m-xylene,
2,6-dihydroxydibenzo-p-dioxine,
2,6-dihydroxythianthrene,
2,7-dihydroxyphenoxathine,
9,10-dimethyl-2,7-dihydroxyphenazine,
3,6-dihydroxydibenzofuran,
3,6-dihydroxydibenzothiophene,
4,4'-dihydroxybiphenyl,
1,4-dihydroxynaphthalene,
2,7-dihydroxypyrene,
hydroquinone,
resorcin,
ethylene glycol-bis(4-hydroxybenzoate),
diethylene glycol-bis(4-hydroxybenzoate),
triethylene glycol-bis(4-hydroxybenzoate),
1,3-bis(4-hydroxyphenyl)-tetramethyldisiloxane, and
phenol-modified silicone oil.

Further, an aromatic diol having an ester linkage produced by the reaction between 2 moles of a diol and one mole of isophthaloyl chloride or terephthaloyl chloride is also usable.

The structural units of formulas (2) and (3) having charge transporting properties will now be explained in detail by referring to the diols of formulas (11) and (12), that is, starting materials of the structural units of formulas (2) and (3), respectively.

In formula (11), $R^5$ is a hydrogen atom, or the same substituted or unsubstituted alkyl group or the same substituted or unsubstituted aryl group as defined in the description of $R^1$ to $R^4$.

In formula (11), $Ar^1$ is an aryl group which may have a substituent. Specific examples of the substituted or unsubstituted aryl group represented by $Ar^1$ include a monovalent group derived from a heterocyclic group having an amine structure, such as pyrrole, pyrazole, imidazole, triazole, dioxazole, indole, isoindole, benzimidazole, benzotriazole, benzisoxazine, carbazole and phenoxazine; and a group represented by the following formula (14):

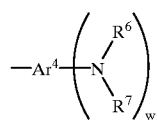

(14)

wherein $R^6$ and $R^7$ which may be the same or different, are each an acyl group, an alkyl group which may have a substituent, or an aryl group which may have a substituent; $Ar^4$ is an arylene group; and w is an integer of 1 to 3.

The above-mentioned aryl group represented by $Ar^1$ may have a substituent, for example, the same substituted or unsubstituted alkyl group, the same substituted or unsubstituted aryl group as defined in the description of $R^1$ to $R^4$, or a halogen atom such as fluorine atom, chlorine atom, bromine atom or iodine atom.

In formula (14), there can be employed acetyl group, propionyl group, and benzoyl group as the acyl group represented by $R^6$ and $R^7$. In addition, for $R^6$ and $R^7$, there can be employed the same substituted and unsubstituted alkyl group as defined in the description of $R^1$ to $R^4$.

Furthermore, examples of the substituted or unsubstituted aryl group represented by $R^6$ and $R^7$ include the same substituted and unsubstituted alkyl group as defined in the description of $R^1$ to $R^4$, and a group represented by the following formula (15):

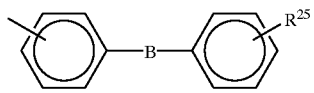
(15)

wherein $R^{25}$ is a hydrogen atom, the same substituted or unsubstituted alkyl group as defined in the description of $R^1$ to $R^4$, an alkoxyl group, a halogen atom, the same substituted or unsubstituted aryl group as defined in the description of $R^1$ to $R^4$, an amino group, nitro group, or cyano group; and B is seleceted from the group consisting of —O—, —S—, —SO—, —SO$_2$—, —CO—, and the following bivalent groups:

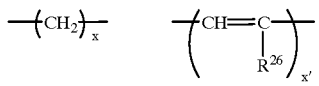

in which x is an integer of 1 to 12; x' is an integer of 1 to 3; and $R^{26}$ is a hydrogen atom, the same substituted or unsubstituted alkyl group as defined in the description of $R^1$ to $R^4$, or the same substituted or unsubstituted aryl group as defined in the description of $R^1$ to $R^4$.

Examples of the alkoxyl group represented by $R^{25}$ in formula (15) are methoxy group, ethoxy group, n-propoxy group, iso-propoxy group, n-butoxy group, iso-butoxy group, s-butoxy group, t-butoxy group, 2-hydroxyethoxy group, 2-cyanoethoxy group, benzyloxy group, 4-methylbenzyloxy group and trifluoromethoxy group.

Examples of the halogen atom represented by $R^{25}$ in formula (15) are fluorine atom, chlorine atom, bromine atom and iodine atom.

As the amino group represented by $R^{25}$ in formula (15), there can be employed the same amino group that defined as the substituent for the aryl group represented by $R^1$ to $R^4$.

As the arylene group represented by $Ar^4$ in formula (14), there can be employed any bivalent groups derived from the same substituted or unsubstituted aryl group as defined in the description of $R^1$ to $R^4$.

Similarly in formulas (11) and (12), there can be employed as the arylene group represented by $Ar^2$ and $Ar^3$ any bivalent groups derived from the same substituted or unsubstituted aryl group as defined in the description of $R^1$ to $R^4$.

The structural unit of formula (6) will now be explained by referring to the diol of formula (13), that is, a starting material of the structural unit of formula (6).

In formula (13), e and f are each independently an integer of 0 to 5; and $R^3$ and $R^9$ are each independently a halogen atom, a substituted or unsubstituted alkyl group having 1 to 6 carbon atoms, a substituted or unsubstituted alkoxyl group having 1 to 6 carbon atoms, or a substituted or unsubstituted aryl group. When e and f are each an integer of 2 to 5, $R^8$ and $R^9$ are each the same or different.

Examples of the above-mentioned substituted or unsubstituted alkyl group represented by $R^8$ and $R^9$, and examples of the above-mentioned substituted or unsubstituted aryl group represented by $R^8$ and $R^9$ are the same as those defined in the description of $R^1$ to $R^4$.

Examples of the halogen atom represented by $R^8$ and $R^9$ are fluorine atom, chlorine atom, bromine atom and iodine atom.

Examples of the alkoxyl group represented by $R^8$ and $R^9$ are methoxy group, ethoxy group, n-propoxy group, i-propoxy group, n-butoxy group, i-butoxy group, s-butoxy group, t-butoxy group, 2-hydroxyethoxy group, 2-cyanoethoxy group, benzyloxy group, 4-methylbenzyloxy group, and trifluoromethoxy group.

When the polycarbonate resin in the form of a copolymer comprising the structural unit of formula (1) and the structural unit of formula (2) is employed for the photoconductive layer, the charge transporting properties of the polycarbonate resin depend upon the content of the structural unit of formula (2). Therefore, it is preferable that the amount of structural unit having formula (2) be 5 wt. % or more, more preferably in the range of 10 to 90 wt. % of the total weight of the polycarbonate resin.

According to the present invention, the aromatic polycarbonate resin can be provided with charge transporting properties by using the structural unit of formula (1) and the structural unit having charge transporting properties, represented by formula (2), (4) or (6) in combination. In order to improve the electrical characteristics and the mechanical characteristics, the structural unit of formula (1) and other conventional structural units with charge transporting properties can be used together. Namely, to provide such a polycarbonate resin, at least one diol represented by formula (8) may be subjected to polymerization together with at least one of the conventional diols to be described later. Further addition of the previously mentioned diol of formula (10) makes it possible to provide the polycarbonate resin in the form of a copolymer with improved mechanical strength. In this case, a plurality of diols represented by formula (10) can be employed. The amount ratio of the diol of formula (8) and the amount ratio of the conventional diol with charge transporting properties may be selected within a wide range in light of the desired characteristics of the obtained aromatic polycarbonate resin. In the present invention, the amount of the structural unit of formula (1) may be controlled to 5 wt. % or more, and the amount of the structural unit with charge transporting properties may be controlled to 5 wt. % or more, of the total weight of the aromatic polycarbonate resin.

Examples of the above-mentioned conventional diol with charge transporting properties are as follows: acetophenone derivatives (Japanese Laid-Open Patent Applications 7-325409, 7-258399, 8-269183 and 9-151248), distyrylbenzene derivatives (Japanese Laid-Open Patent Application 9-71642), diphenetylbenzene derivatives (Japanese Laid-Open Patent Applications 9-127713 and 9-104746), α-phenylstilbene derivatives (Japanese Laid-Open Patent Applications 9-297419, 9-97424, 9-241369 and 9-272735), butadiene derivatives (Japanese Laid-Open Patent Applications 9-80783 and 9-235367), hydrogenated butadiene derivatives (Japanese Laid-Open Patent Applications 9-80784 and 9-87376), diphenylcyclohexane derivatives (Japanese Laid-Open Patent Applications 9-80772 and 9-110976), distyryltriphenylamine derivatives (Japanese Laid-Open Patent Applications 9-222740 and 9-268226), distyryldiamine derivatives, distyryldiamine derivatives, diphenyldistyrylbenzene derivatives (Japanese Laid-Open Patent Applications 9-265197, 9-265201, 9-221544 and 9-227669), stilbene derivatives (Japanese Laid-Open Patent Applications 9-211877 and 9-157378), m-phenylenediamine derivatives (Japanese Laid-Open Patent Applications 9-304956, 9-304957, 9-302084 and 9-302085), resorcin derivatives (Japanese Laid-Open Patent Applications 9-329907 and 9-328539), and triarylamine derivatives (Japanese Laid-Open Patent Applications 64-9964, 7-199503, 8-176293, 8-208820, 8-253568, 8-269446, 3-221522, 4-11627, 4-183719, 4-124163, 4-320420, 4-316543, 5-310904, 7-56374, and 8-62864, and U.S. Pat. Nos. 5,428,090 and 5,486,439.).

In the above-mentioned polycarbonate resin comprising the structural unit of formula (1) and the conventional structural unit with charge transporting properties, the charge transporting properties of the obtained polycarbonate resin depend upon the content of the structural unit with the charge transporting properties. It is therefore preferable that the amount of structural unit having charge transporting properties be 5 wt. % or more, more preferably in the range of 10 to 90 wt. % of the total weight of the polycarbonate resin.

As previously explained, both the aromatic polycarbonate resin serving as a binder resin, and the aromatic polycarbonate resin having charge transporting properties are used in the photoconductive layer of the electrophotographic photoconductor.

The embodiments of the electrophotographic photoconductor according to the present invention will be described later, provided that the aromatic polycarbonate resin having charge transporting properties is employed in the photoconductive layer. In the case where the aromatic polycarbonate resin for use in the photoconductive layer essentially consists of the structural unit of formula (1), in other words, when the aromatic polycarbonate for use in the photoconductive layer is not provided with charge transporting properties, a conventional low-molecular weight charge transport material may be contained in the photoconductive layer. By the addition of such a low-molecular weight charge transport material, a desired charge transport layer or charge transport medium can be obtained even though the above-mentioned polycarbonate resin for use in the photoconductive layer works only as a binder resin. Even when the polycarbonate resin of the present invention provided with charge transporting properties is used for the preparation of the charge transport medium, the above-mentioned low-molecular weight charge transport material may also be employed.

Specific examples of the low-molecular weight charge-transport materials are as follows: oxazole derivatives, oxadiazole derivatives (Japanese Laid-Open Patent Applications 52-139065 and 52-139066), imidazole derivatives, triphenylamine derivatives (Japanese Laid-Open Patent Application 3-285960), benzidine derivatives (Japanese Patent Publication 58-32372), α-phenylstilbene derivatives (Japanese Laid-Open Patent Application 57-73075), hydrazone derivatives (Japanese Laid-Open Patent Applications 55-154955, 55-156954, 55-52063, and 56-81850), triphenylmethane derivatives (Japanese Patent Publication 51-10983), anthracene derivatives (Japanese Laid-Open Patent Application 51-94829), styryl derivatives (Japanese Laid-Open Patent Applications 56-29245 and 58-198043), carbazole derivatives (Japanese Laid-Open Patent Application 58-58552), and pyrene derivatives (Japanese Laid-Open Patent Application 2-94812).

According to the present invention, at least one of the previously mentioned aromatic polycarbonate resins is contained in different ways, for example, in photoconductive layers 2, 2a, 2b, 2c, 2d, and 2e, as shown in FIGS. 1 through 6.

In the photoconductor shown in FIG. 1, a photoconductive layer 2 is formed on an electroconductive support 1, which photoconductive layer 2 comprises the previously mentioned aromatic polycarbonate resin according to the present invention and a sensitizing dye, with the addition thereto of a binder agent (binder resin) when necessary. In this photoconductor, the aromatic polycarbonate resin works as a photoconductive material, through which charge carriers necessary for the light decay of the photoconductor are generated and transported. However, the aromatic polycarbonate resin itself scarcely absorbs light in the visible light range and, therefore, it is necessary to add a sensitizing dye which absorbs light in the visible light range in order to form latent electrostatic images by use of visible light.

Figure 2:
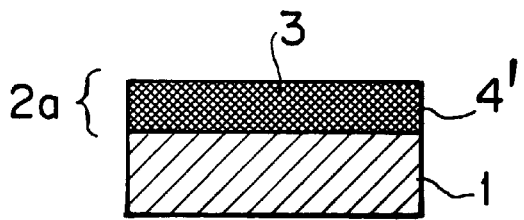

Referring to FIG. 2, there is shown an enlarged cross-sectional view of another embodiment of an electrophotographic photoconductor according to the present invention. In this photoconductor, there is formed a photoconductive layer 2a on an electroconductive support 1. The photoconductive layer 2a comprises a charge transport medium 4' comprising (i) an aromatic polycarbonate resin having charge transporting properties according to the present invention, optionally in combination with a binder agent, and (ii) a charge generation material 3 dispersed in the charge transport medium 4'. In this embodiment, the aromatic polycarbonate resin (or a mixture of the aromatic polycarbonate resin and the binder agent) constitutes the charge transport medium 4'. The charge generation material 3, which is, for example, an inorganic material or an organic pigment, generates charge carriers. The charge transport medium 4' accepts the charge carriers generated by the charge generation material 3 and transports those charge carriers.

In this electrophotographic photoconductor of FIG. 2, it is basically necessary that the light-absorption wavelength regions of the charge generation material 3 and the aromatic polycarbonate resin not overlap in the visible light range. This is because, in order that the charge generation material 3 produce charge carriers efficiently, it is necessary that light pass through the charge transport medium 4' and reach the surface of the charge generation material 3. Since the aromatic polycarbonate resin of the present invention do not substantially absorb light with a wavelength of 600 nm or more, it can work effectively as a charge transport material when used with the charge generation material 3 which absorbs the light in the visible region to the near infrared region and generates charge carriers. The charge transport medium 4' may further comprise the previously mentioned low-molecular weight charge transport material.

Figure 3:
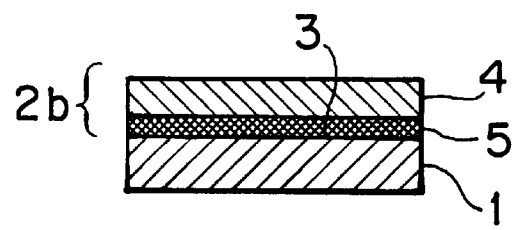

Referring to FIG. 3, there is shown an enlarged cross-sectional view of a further embodiment of an electrophotographic photoconductor according to the present invention. In the figure, there is formed on an electroconductive support 1 a two-layered photoconductive layer 2b comprising a charge generation layer 5 containing a charge generation material 3, and a charge transport layer 4 comprising an aromatic polycarbonate resin with the charge transporting properties according to the present invention.

In this photoconductor, light which has passed through the charge transport layer 4 reaches the charge generation layer 5, and charge carriers are generated within the charge generation layer 5. The charge carriers which are necessary for the light decay for latent electrostatic image formation are generated by the charge generation material 3, and accepted and transported by the charge transport layer 4. The generation and transportation of the charge carriers are performed by the same mechanism as that in the photoconductor shown in FIG. 2.

In this case, the charge transport layer 4 comprises the aromatic polycarbonate resin with charge transporting properties, optionally in combination with a binder agent. Furthermore, in order to increase the efficiency of generating the charge carriers, the charge generation layer 5 may further comprise the above-mentioned aromatic polycarbonate resin, and the photoconductive layer 2b including the charge generation layer 5 and the charge transport layer 4 may further comprise the previously mentioned low-molecular weight charge transport material. This can be applied to the embodiments of FIGS. 4 to 6 to be described later.

Figure 4:
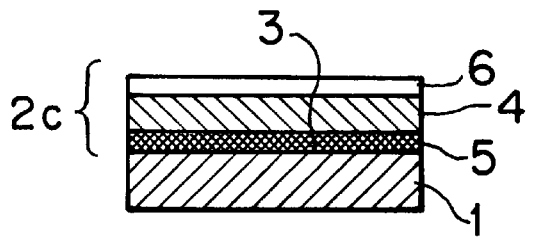

In the electrophotographic photoconductor of FIG. 3, a protective layer 6 may be provided on the charge transport layer 4 as shown in FIG. 4. The protective layer 6 may comprise the aromatic polycarbonate resin of the present invention, optionally in combination with a binder agent. In such a case, it is effective that the protective layer 6 be provided on a charge transport layer in which a low-molecular weight charge transport material is dispersed. The protective layer 6 may be provided on the photoconductive layer 2a of the photoconductor shown in FIG. 2.

Figure 5:
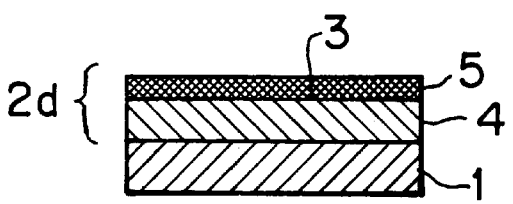

Referring to FIG. 5, there is shown still another embodiment of an electrophotographic photoconductor according to the present invention. In this figure, the overlaying order of the charge generation layer 5 and the charge transport layer 4 comprising the aromatic polycarbonate resin is reversed in view of the electrophotographic photoconductor as shown in FIG. 3. The mechanism of the generation and transportation of charge carriers is substantially the same as that of the photoconductor shown in FIG. 3.

Figure 6:
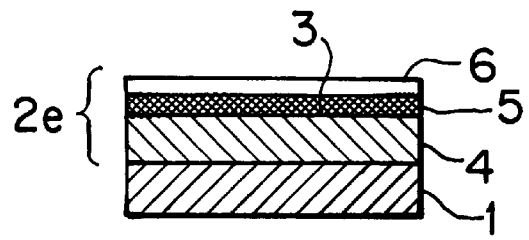

In the above photoconductor of FIG. 5, a protective layer 6 may be formed on the charge generation layer 5 as shown in FIG. 6 in light of the mechanical strength of the photoconductor.

When the electrophotographic photoconductor according to the present invention shown in FIG. 1 is fabricated, at least one aromatic polycarbonate resin with charge transporting properties is dissolved in a solvent, with the addition thereto of a binder agent when necessary. To the thus prepared solution, a sensitizing dye is added, so that a coating liquid for the photoconductive layer 2 is prepared. The thus prepared photoconductive layer coating liquid is coated on an electroconductive support 1 and dried, so that a photoconductive layer 2 is formed on the electroconductive support 1.

It is preferable that the thickness of the photo-conductive layer 2 be in the range of 3 to 50 μm, more preferably in the range of 5 to 40 μm. It is preferable that the amount of aromatic polycarbonate resin with charge transporting properties be in the range of 30 to 100 wt. % of the total weight of the photoconductive layer 2. It is preferable that the amount of sensitizing dye for use in the photoconductive layer 2 be in the range of 0.1 to 5 wt. %, more preferably in the range of 0.5 to 3 wt. % of the total weight of the photoconductive layer 2.

Specific examples of the sensitizing dye for use in the present invention are triarylmethane dyes such as Brilliant Green, Victoria Blue B, Methyl Violet, Crystal Violet and Acid Violet 6B; xanthene dyes such as Rhodamine B, Rhodamine 6G, Rhodamine G Extra, Eosin S, Erythrosin, Rose Bengale and Fluoresceine; thiazine dyes such as Methylene Blue; and cyanine dyes such as cyanin.

The electrophotographic photoconductor shown in FIG. 2 can be produced by the following method:

The finely-divided particles of the charge generation material 3 are dispersed in a solution in which at least one aromatic polycarbonate resin with charge transporting properties, or a mixture of the aromatic polycarbonate resin and the binder agent is dissolved, so that a coating liquid for the photoconductive layer 2a is prepared. The coating liquid thus prepared is coated on the electroconductive support 1 and then dried, whereby the photoconductive layer 2a is provided on the electroconductive support 1.

It is preferable that the thickness of the photo-conductive layer 2a be in the range of 3 to 50 μm, more preferably in the range of 5 to 40 μm. It is preferable that the amount of aromatic polycarbonate resin with charge transporting properties be in the range of 40 to 100 wt. % of the total weight of the photoconductive layer 2a.

It is preferable that the amount of charge generation material 3 for use in the photoconductive layer 2a be in the range of 0.1 to 50 wt. %, more preferably in the range of 1 to 20 wt. % of the total weight of the photoconductive layer 2a.

Specific examples of the charge generation material 3 for use in the present invention are as follows: inorganic materials such as selenium, selenium-tellurium, cadmium sulfide, cadmium sulfide-selenium and α-silicon (amorphous silicon) and organic pigments, for example, azo pigments, such as C.I. Pigment Blue 25 (C.I. 21180), C.I. Pigment Red 41 (C.I. 21200), C.I. Acid Red 52 (C.I. 45100), C.I. Basic Red 3 (C.I. 45210), an azo pigment having a carbazole skeleton (Japanese Laid-Open Patent Application 53-95033), an azo pigment having a distyryl benzene skeleton (Japanese Laid-Open Patent Application 53-133445), an azo pigment having a triphenylamine skeleton (Japanese Laid-Open Patent Application 53-132347), an azo pigment having a dibenzothiophene skeleton (Japanese Laid-Open Patent Application 54-21728), an azo pigment having an oxadiazole skeleton (Japanese Laid-Open Patent Application 54-12742), an azo pigment having a fluorenone skeleton (Japanese Laid-Open Patent Application 54-22834), an azo pigment having a bisstilbene skeleton (Japanese Laid-Open Patent Application 54-17733), an azo pigment having a distyryl oxadiazole skeleton (Japanese Laid-Open Patent Application 54-2129), and an azo pigment having a distyryl carbazole skeleton (Japanese Laid-Open Patent Application 54-14967); phthalocyanine pigments such as C.I. Pigment Blue 16 (C.I. 74100); indigo pigments such as C.I. Vat Brown 5 (C.I. 73410) and C.I. Vat Dye (C.I. 73030); and perylene pigments such as Algol Scarlet B and Indanthrene Scarlet R (made by Bayer Co., Ltd.). These charge generation materials may be used alone or in combination.

When the above-mentioned charge generation material comprises a phthalocyanine pigment, the sensitivity and durability of the obtained photoconductor are remarkably improved. in such a case, there can be employed a phthalocyanine pigment having a phthalocyanine skeleton as indicated by the following formula (16):

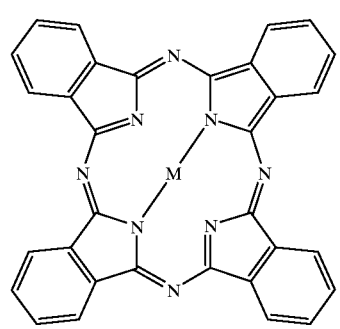

(16)

In the above formula (16), M (central atom) is a metal atom or hydrogen atom.

To be more specific, as the central atom (M) in the above formula, there can be employed an atom of H, Li, Be, Na, Mg, Al, Si, K, Ca, Sc, Ti, V, Cr, Mn, Fe, Co, Ni, Cu, Zn, Ga, Ge, Y, Zr, Nb, Mo, Tc, Ru, Rh, Pd, Ag, Cd, In, Sn, Sb, Ba, Hf, Ta, W, Re, Os, Ir, Pt, Au, Hg, Tl, La, Ce, Pr, Nd, Pm, Sm, Eu, Gd, Tb, Dy, Ho, Er, Tm, Yb, Lu, Th, Pa, U, Np or Am; the combination of atoms forming an oxide, chloride, fluoride, hydroxide or bromide. The central atom is not limited to the above-mentioned atoms.

The above-mentioned charge generation material with a phthalocyanine structure for use in the present invention may have at least the basic structure as indicated by the above-mentioned formula (16). Therefore, the charge generation material may have a dimer structure or trimer structure, and further, a polymeric structure. Further, the above-mentioned basic structure of the above formula (16) may have a substituent.

Of the phthalocyanine compounds represented by formula (16), an oxotitanium phthalocyanine compound which has the central atom (M) of TiO in the formula (16) and a metal-free phthalocyanine compound which has a hydrogen atom as the central atom (M) are particularly preferred in the present invention because the obtained photoconductors show excellent photoconductive properties.

In addition, it is known that each phthalocyanine compound has a variety of crystal systems. For example, the above-mentioned oxotitanium phthalocyanine has crystal systems of α-type, β-type, γ-type, m-type, and y-type. In the case of copper phthalocyanine, there are crystal systems of α-type, β-type, and γ-type. The properties of the phthalocyanine compound vary depending on the crystal system thereof although the central metal atom is the same. According to "Electrophotography—the Society Journal—Vol. 29, No. 4 (1990)", it is reported that the properties of the photoconductor vary depending on the crystal system of a phthalocyanine contained in the photoconductor. In light of the desired photoconductive properties, therefore, it is important to employ the phthalocyanine compounds each having the optimal crystal system. The oxotitanium phthalocyanine in the y-type crystal system is particularly advantageous.

A plurality of charge generation materials with phthalocyanine skeleton may be used in combination in the charge generation layer. Further, such charge generation materials with phthalocyanine skeleton may be used in combination with other charge generation materials not having phthalocyanine skeleton. In this case, inorganic and organic conventional charge generation materials are usable.

Specific examples of the inorganic charge generation materials are crystalline selenium, amorphous selenium, selenium-tellurium, selenium-tellurium-halogen, selenium-arsenic compound, and a-silicon (amorphous silicon). In particular, when the above-mentioned a-silicon is employed as the charge generation material, it is preferable that the dangling bond be terminated with hydrogen atom or a halogen atom, or be doped with boron atom or phosphorus atom.

Specific examples of the organic charge generation materials that can be used in combination with the phthalocyanine compound include an azulenium salt pigment, a squaric acid methine pigment, an azo pigment having a carbazole skeleton, an azo pigment having a triphenylamine skeleton, an azo pigment having a diphenylamine skeleton, an azo pigment having a dibenzothiophene skeleton, an azo pigment having a fluorenone skeleton, an azo pigment having an oxadiazole skeleton, an azo pigment having a bisstilbene skeleton, an azo pigment having a distyryl oxadiazole skeleton, an azo pigment having a distyryl carbazole skeleton, a perylene pigment, an anthraquinone pigment, a polycyclic quinone pigment, a quinone imine pigment, a diphenylmethane pigment, a triphenylmethane pigment, a benzoquinone pigment, a naphthoquinone pigment, a cyanine pigment, an azomethine pigment, an indigoid pigment, and a bisbenzimidazole pigment.

The electrophotographic photoconductor shown in FIG. 3 can be produced by the following method:

To provide the charge generation layer 5 on the electroconductive support 1, the charge generation material is vacuum-deposited on the electroconductive support 1. Alternatively, the finely-divided particles of the charge generation material 3 are dispersed in an appropriate solvent, together with the binder agent when necessary, so that a coating liquid for the charge generation layer 5 is prepared. The thus prepared coating liquid is coated on the electroconductive support 1 and dried, whereby the charge generation layer 5 is formed on the electroconductive support 1. The charge generation layer 5 may be subjected to surface treatment by buffing and adjustment of the thickness thereof if required. On the thus formed charge generation layer 5, a coating liquid in which at least one aromatic polycarbonate resin with charge transporting properties, optionally in combination with a binder agent, is dissolved is coated and dried, so that the charge transport layer 4 is formed on the charge generation layer 5. In the charge generation layer 5, the same charge generation materials as employed in the above-mentioned photoconductive layer 2a can be used.

The thickness of the charge generation layer 5 is 5 $\mu$m or less, preferably 2 $\mu$m or less. It is preferable that the thickness of the charge transport layer 4 be in the range of 3 to 50 $\mu$m, more preferably in the range of 5 to 40 $\mu$m.

When the charge generation layer 5 is provided on the electroconductive support 1 by coating the dispersion in which finely-divided particles of the charge generation material 3 are dispersed in an appropriate solvent, it is preferable that the amount of finely-divided particles of the charge generation material 3 for use in the charge generation layer 5 be in the range of 10 to 100 wt. %, more preferably in the range of about 50 to 100 wt. % of the total weight of the charge generation layer 5. It is preferable that the amount of aromatic polycarbonate resin of the present invention 4 be in the range of 40 to 100 wt. % of the total weight of the charge transport layer 4.

The photoconductive layer 2b of the photoconductor shown in FIG. 3 may comprise a low-molecular-weight charge transport material as previously mentioned.

To produce the photoconductor shown in FIG. 4, a coating liquid for the protective layer 6 is prepared by dissolving the previously mentioned aromatic polycarbonate resin, optionally in combination with the binder agent, in a solvent, and the thus obtained coating liquid is coated on the charge transport layer 4 of the photoconductor shown in FIG. 3, and dried.

It is preferable that the thickness of the protective layer 6 be in the range of 0.15 to 10 $\mu$m. It is preferable that the amount of aromatic polycarbonate resin for use in the protective layer 6 be in the range of 40 to 100 wt. % of the total weight of the protective layer 6.

The electrophotographic photoconductor shown in FIG. 5 can be produced by the following method:

The aromatic polycarbonate resin of the present invention, optionally in combination with the binder agent, is dissolved in a solvent to prepare a coating liquid for the charge transport layer 4. The thus prepared coating liquid is coated on the electroconductive support 1 and dried, whereby the charge transport layer 4 is provided on the electroconductive support 1. On the thus formed charge transport layer 4, a coating liquid prepared by dispersing the finely-divided particles of the charge generation material 3 in a solvent in which the binder agent may be dissolved when necessary, is coated, for example, by spray coating, and dried, so that the charge generation layer 5 is provided on the charge transport layer 4. The amount ratios of the components contained in the charge generation layer 5 and charge transport layer 4 are the same as those previously mentioned in the description of FIG. 3.

When the previously mentioned protective layer 6 is formed on the above prepared charge generation layer 5, the electrophotographic photoconductor shown in FIG. 6 can be fabricated.

To fabricate any of the aforementioned photoconductors of the present invention, a metallic plate or foil made of aluminum, a plastic film on which a metal such as aluminum is deposited, and a sheet of paper which has been treated so as to be electroconductive can be employed as the electroconductive support 1.

Specific examples of the binder agent used in the preparation of the photoconductor according to the present invention are condensation resins such as polyamide, polyurethane, polyester, epoxy resin, polyketone and polycarbonate; and vinyl polymers such as polyvinylketone, polystyrene, poly-N-vinylcarbazole and polyacrylamide. All the resins that have electrically insulating properties and adhesion properties can be employed.

Some plasticizers may be added to the above-mentioned binder agents, when necessary. Examples of the plasticizer for use in the present invention are halogenated paraffin, dimethylnaphthalene and dibutyl phthalate. Further, a variety of additives such as an antioxidant, a light stabilizer, a thermal stabilizer and a lubricant may also be contained in the binder agents when necessary.

Furthermore, in the electrophotographic photoconductor according to the present invention, an intermediate layer such as an adhesive layer or a barrier layer may be interposed between the electroconductive support and the photoconductive layer when necessary.

Examples of the material for use in the intermediate layer are polyamide, nitrocellulose, aluminum oxide and titanium oxide. it is preferable that the thickness of the intermediate layer be 1 $\mu$m or less.

When copying is performed by use of the photoconductor according to the present invention, the surface of the photoconductor is uniformly charged to a predetermined polarity in the dark. The uniformly charged photoconductor is exposed to a light image so that a latent electrostatic image is formed on the surface of the photoconductor. The thus formed latent electrostatic image is developed to a visible image by a developer, and the developed image can be transferred to a sheet of paper when necessary.

The photosensitivity and the durability of the electrophotographic photoconductor according to the present invention are remarkably improved.

As mentioned above, the aromatic polycarbonate resin according to the present invention is remarkably useful as a charge transport material when used in combination with the charge generation material in the electrophotographic photoconductor, in particular, in the function-separating electrophotographic photoconductor. In addition to the above, the aromatic polycarbonate resin of the present invention can be preferably employed as electronic devices such as an organic electroluminescent device in the field of electronics.

Other features of this invention will become apparent in the course of the following description of exemplary embodiments, which are given for illustration of the invention and are not intended to be limiting thereof.

Preparation Example 1

[Synthesis of aromatic polycarbonate resin No. 1]

3.23 parts by weight of a diol with charge transporting properties, that is, N-{4-[2,2-bis(4-hydroxyphenyl)vinyl]phenyl}-N,N-bis(4-tolyl)amine, 2.39 parts by weight of a diol serving as a comonomer, that is, 1,3-bis(4-hydroxyphenoxy)benzene, and 0.02 parts by weight of a molecular weight modifier, that is, 4-tert-butyl phenol were placed in a reaction container with stirrer.

The above prepared reaction mixture was dissolved with stirring in a stream of nitrogen under the application of heat thereto, with the addition thereto of an aqueous solution prepared by dissolving 2.96 parts by weight of sodium hydroxide and 0.06 parts by weight of sodium hydrosulfite in 40 parts by weight of water.

Thereafter, the reaction mixture was cooled to 20° C., and vigorously stirred with the addition thereto of a solution prepared by dissolving 1.76 parts by weight of bis(trichloromethyl)carbonate, namely, a trimer of phosgene, in 33 parts by weight of dichloromethane, thereby forming an emulsion. The polymerization reaction was initiated with the emulsion being formed.

The reaction mixture was then stirred for 15 minutes at room temperature. With the addition of 0.007 parts by weight of triethylamine serving as a catalyst, the reaction mixture was further stirred for 60 minutes at room temperature. Then, a solution prepared by dissolving 0.12 parts by weight of phenyl chloroformate serving as a terminator in 5 parts by weight of dichloromethane was added to the reaction mixture, and the resultant mixture was stirred for 60 minutes at room temperature in order to continue the reaction.

Thereafter, by the addition of 200 parts by weight of dichloromethane to the reaction mixture, an organic layer was separated. The resultant organic layer was successively washed with a 3% aqueous solution of sodium hydroxide, a 2% aqueous solution of hydrochloric acid, and water.

The thus obtained organic layer was added dropwise to large quantities of methanol, whereby a yellow polycarbonate resin was precipitated.

Thus, a polycarbonate resin No. 1 (in the form of a random copolymer) according to the present invention was obtained.

The structural units of the polycarbonate resin No. 1 are shown in TABLE 1 and the composition ratio of each structural unit is put beside the structural unit in TABLE 1, on the supposition that the total number of structural units is 1.

The polystyrene-reduced number-average molecular weight (Mn) and weight-average molecular weight (Mw), which were measured by the gel permeation chromatography, were respectively 67,200 and 263,000.

Figure 7:
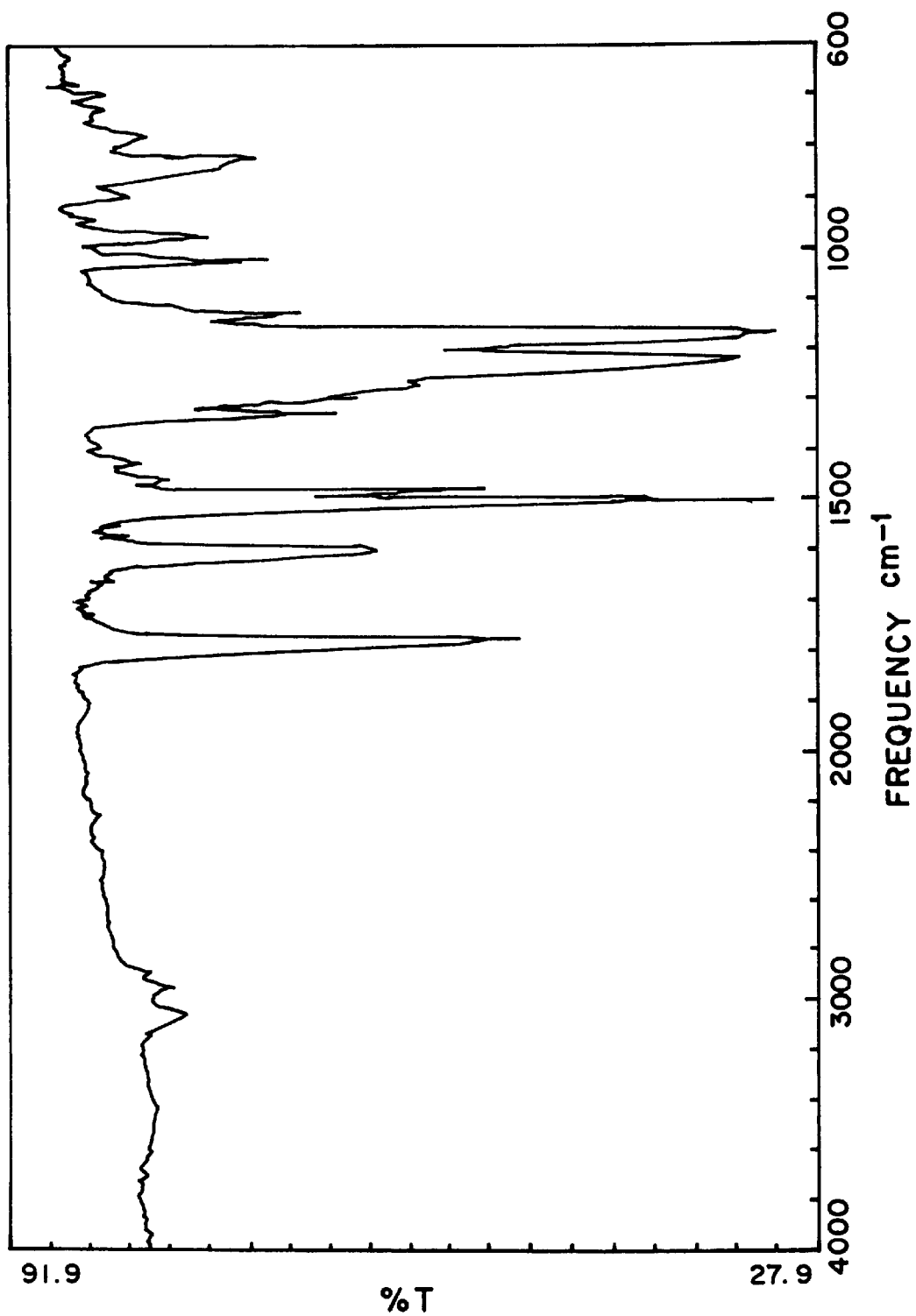

FIG. 7 shows an infrared spectrum of the aromatic polycarbonate resin No. 1, measured from a cast film on an NaCl plate.

The IR spectrum indicates the appearance of the characteristic absorption peak due to C=O stretching vibration of carbonate at 1780 $cm^{-1}$.

The glass transition temperature (Tg) of the above obtained aromatic polycarbonate resin No. 1 was 147.8° C. when measured by use of a differential scanning calorimeter.

Preparation Example 2
[Synthesis of aromatic polycarbonate resin No. 2]

The procedure for preparation of the aromatic polycarbonate resin No. 1 in Preparation Example 1 was repeated except that the comonomer diol of 1,3-bis(4-hydroxyphenoxy)benzene employed in Preparation Example 1 was replaced by 1,4-bis (3-hydroxyphenoxy) benzene.

Thus, an aromatic polycarbonate resin No. 2 in the form of a random copolymer according to the present invention was obtained.

The structural units of the polycarbonate resin No. 2 are shown in TABLE 1.

The polystyrene-reduced number-average molecular weight (Mn) and weight-average molecular weight (Mw), which were measured by the gel permeation chromatography, were respectively 55,100 and 172,000.

Figure 8:
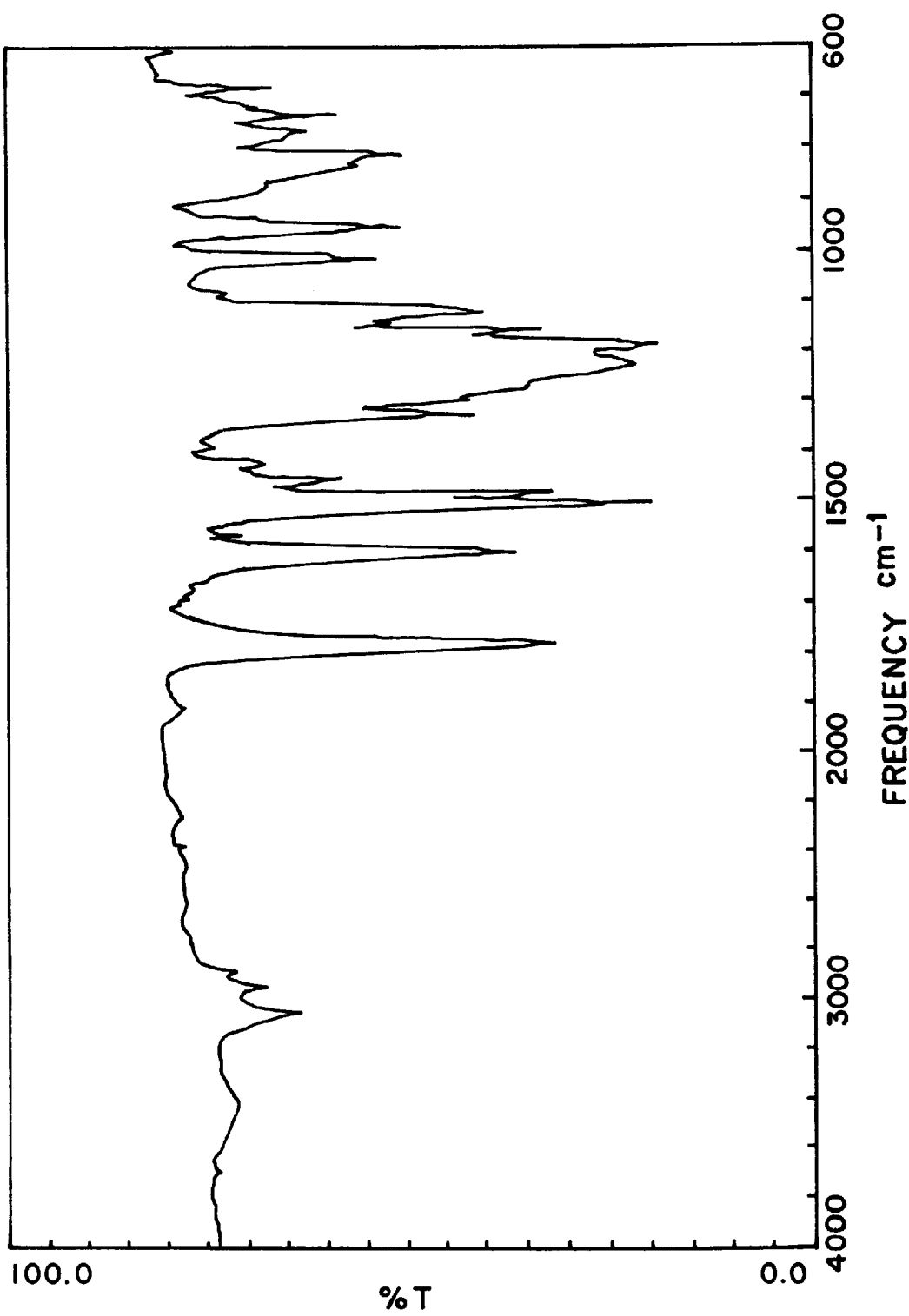

FIG. 8 shows an infrared spectrum of the aromatic polycarbonate resin No. 2, measured from a cast film on an NaCl plate.

The IR spectrum of the aromatic polycarbonate resin No. 2 indicates the appearance of the characteristic absorption peak due to C=O stretching vibration of carbonate at 1780 $cm^{-1}$.

The glass transition temperature (Tg) of the above obtained aromatic polycarbonate resin No. 2 was 139.0° C. when measured by use of a differential scanning calorimeter.

Preparation Example 3
[Synthesis of aromatic polycarbonate resin No. 3]

The procedure for preparation of the aromatic polycarbonate resin No. 1 in Preparation Example 1 was repeated except that the comonomer diol of 1,3-bis(4-hydroxyphenoxy)benzene employed in Preparation Example 1 was replaced by 1,4-bis(4-hydroxyphenoxy)benzene.

Thus, an aromatic polycarbonate resin No. 3 in the form of a random copolymer according to the present invention was obtained.

The structural units of the polycarbonate resin No. 3 are shown in TABLE 1.

The polystyrene-reduced number-average molecular weight (Mn) and weight-average molecular weight (Mw), which were measured by the gel permeation chromatography, were respectively 43,700 and 117,000.

Figure 9:
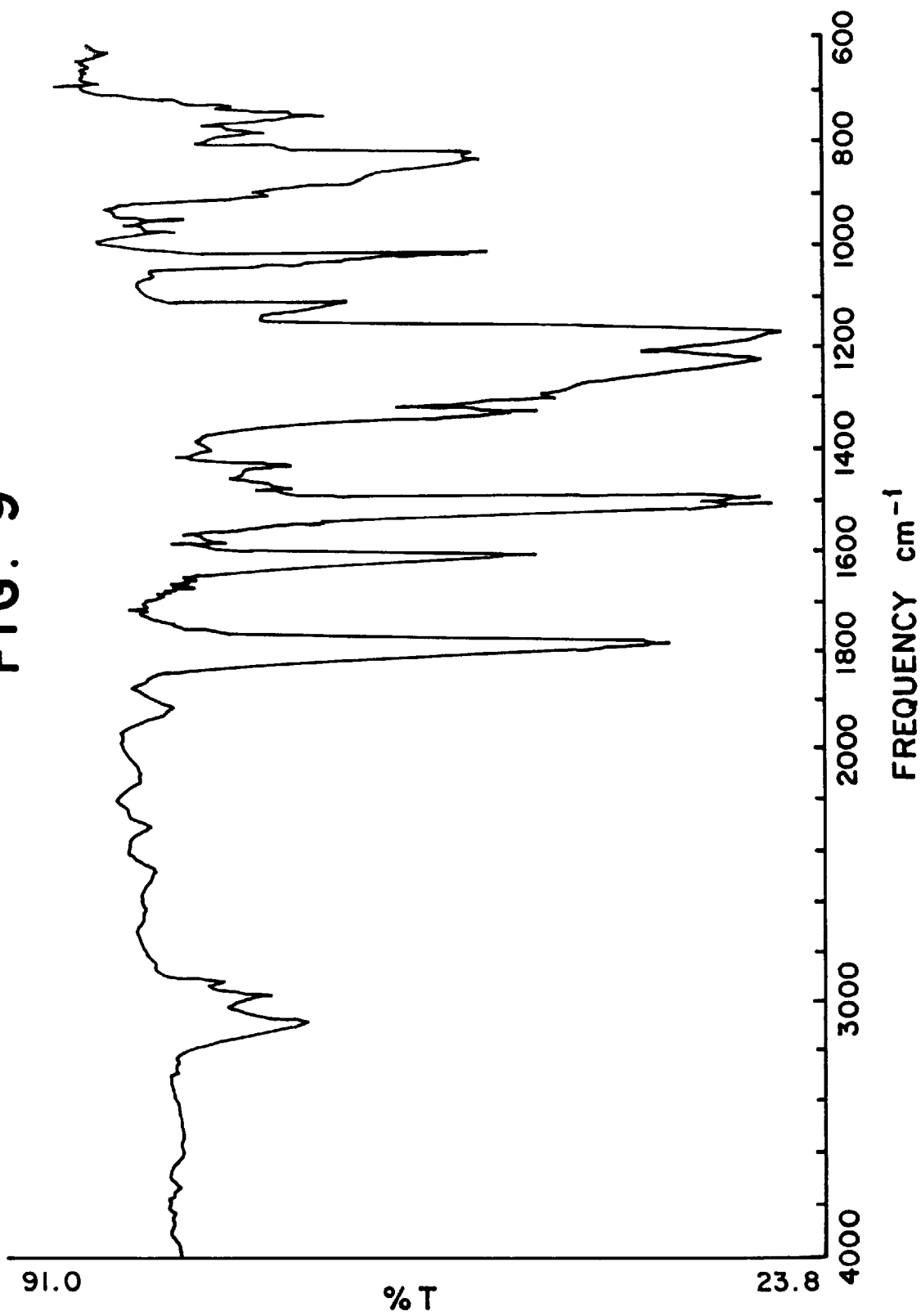

FIG. 9 shows an infrared spectrum of the aromatic polycarbonate resin No. 3, measured from a cast film on an NaCl plate.

The IR spectrum of the aromatic polycarbonate resin No. 3 indicates the appearance of the characteristic absorption peak due to C=O stretching vibration of carbonate at 1780 $cm^{-1}$.

The glass transition temperature (Tg) of the above obtained aromatic polycarbonate resin No. 3 was 157.9° C. when measured by use of a differential scanning calorimeter.

Preparation Example 4
[Synthesis of aromatic polycarbonate resin No. 4]

2.87 parts by weight of 1,3-bis(4-hydroxyphenoxy)benzene, 2.62 parts by weight of 1,1-bis(4-hydroxyphenyl)cyclohexane, and 0.04 parts by weight of a molecular weight modifier, that is, 4-tert-butyl phenol were placed in a reaction container with stirrer.

The above prepared reaction mixture was dissolved with stirring in a stream of nitrogen under the application of heat thereto, with the addition thereto of an aqueous solution prepared by dissolving 3.9 parts by weight of sodium hydroxide and 0.06 parts by weight of sodium hydrosulfite in 40 parts by weight of water.

Thereafter, the reaction mixture was cooled to 20° C., and vigorously stirred with the addition thereto of a solution prepared by dissolving 3.48 parts by weight of bis(trichloromethyl)carbonate, namely, a trimer of phosgene, in 33 parts by weight of dichloromethane, thereby forming an emulsion. The polymerization reaction was initiated with the emulsion being formed.

The reaction mixture was then stirred for 15 minutes at room temperature. With the addition of 0.007 parts by weight of triethylamine serving as a catalyst, the reaction mixture was further stirred for 60 minutes at room temperature in order to continue the reaction.

Thereafter, by the addition of 200 parts by weight of dichloromethane to the reaction mixture, an organic layer was separated. The resultant organic layer was successively washed with a 3% aqueous solution of sodium hydroxide, a 2% aqueous solution of hydrochloric acid, and water.

The thus obtained organic layer was added dropwise to large quantities of methanol, whereby a yellow polycarbonate resin was precipitated.

Thus, a polycarbonate resin No. 4 (in the form of a random copolymer) according to the present invention was obtained.

The structural units of the polycarbonate resin No. 4 are shown in TABLE 1 and the composition ratio of each structural unit is put beside the structural unit in TABLE 1, on the supposition that the total number of structural units is 1.

The polystyrene-reduced number-average molecular weight (Mn) and weight-average molecular weight (Mw), which were measured by the gel permeation chromatography, were respectively 44,500 and 115,000.

Figure 10:
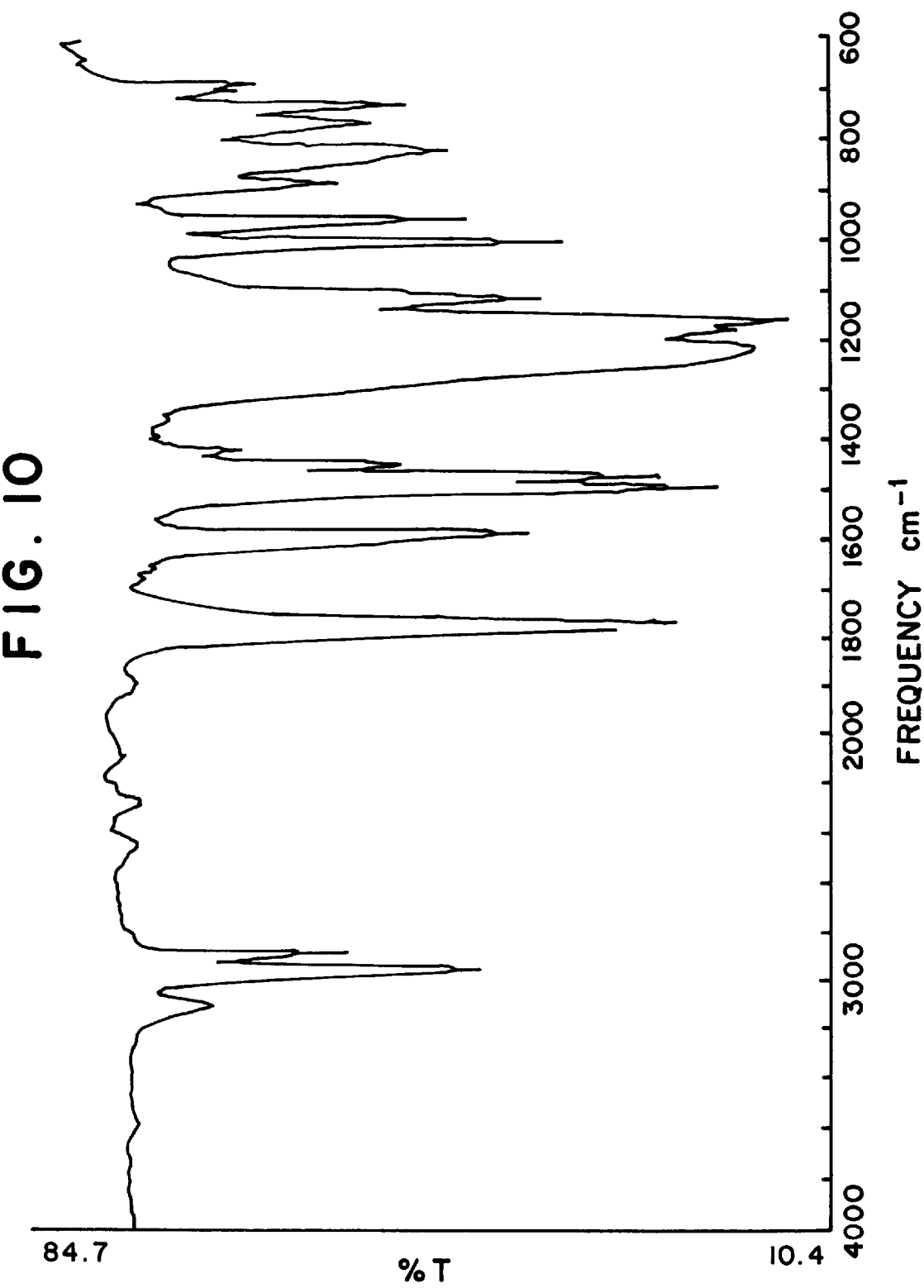

FIG. 10 shows an infrared spectrum of the aromatic polycarbonate resin No. 4, measured from a cast film on an NaCl plate.

The IR spectrum indicates the appearance of the characteristic absorption peak due to C=O stretching vibration of carbonate at 1775 $cm^{-1}$.

The glass transition temperature (Tg) of the above obtained aromatic polycarbonate resin No. 4 was 125.3° C. when measured by use of a differential scanning calorimeter.

TABLE 1
| Preparation Example No. | Polycarbonate Resin No. | Structure of Polycarbonate Resin | Molecular Weight Mn | Molecular Weight Mw | Tg (°C.) |
|---|---|---|---|---|---|
| 1 | 1 | 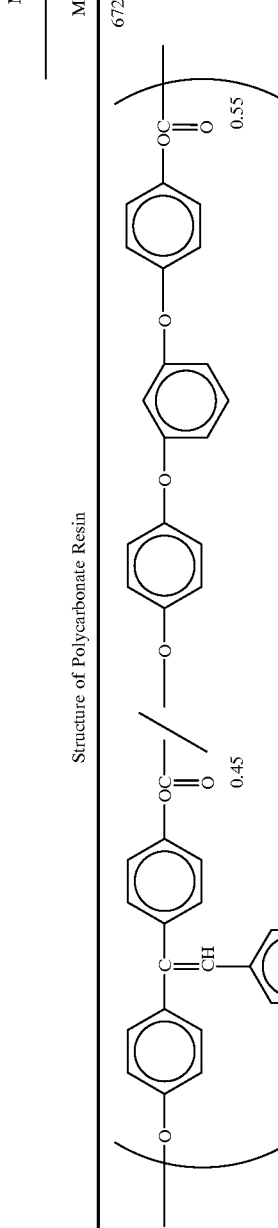 | 67200 | 263000 | 147.8 |
| 2 | 2 | 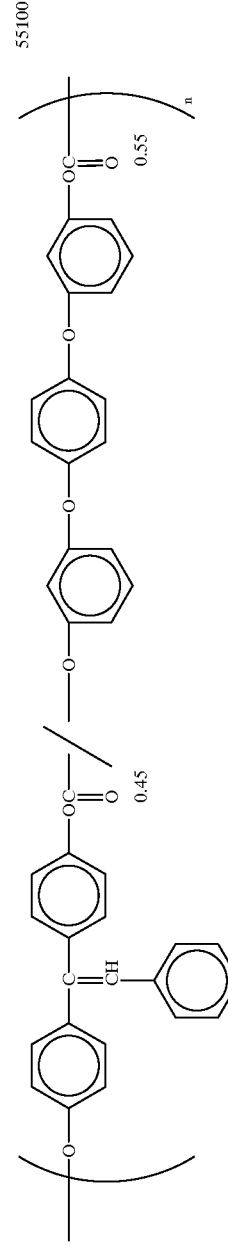 | 55100 | 172000 | 139.0 |

TABLE 1-continued
| Preparation Example No. | Polycarbonate Resin No. | Structure of Polycarbonate Resin | Molecular Weight Mn | Molecular Weight Mw | Tg (°C.) |
|---|---|---|---|---|---|
| 3 | 3 | 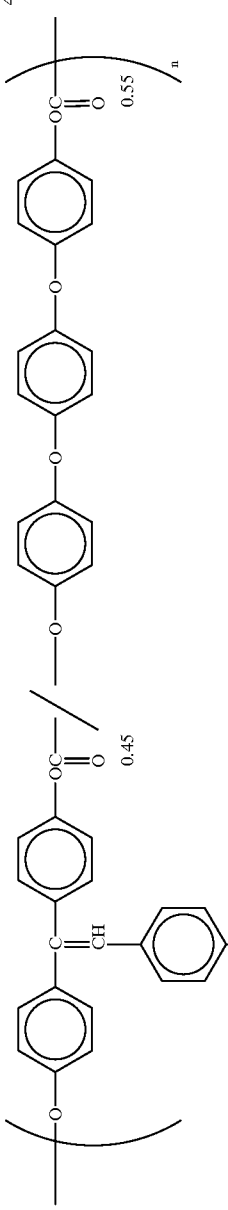 | 43700 | 117000 | 157.9 |
| 4 | 4 | 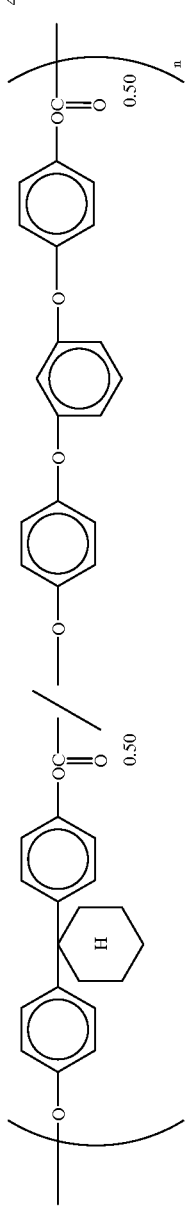 | 44500 | 115000 | 125.3 |

EXAMPLE 1

Fabrication of Photoconductor No. 1
(Formation of intermediate layer)

A commercially available polyamide resin (Trademark "CM-8000", made by Toray Industries, Inc.) was dissolved in a mixed solvent of methanol and butanol, so that a coating liquid for an intermediate layer was prepared.

The thus prepared coating liquid was coated on an aluminum plate by a doctor blade, and dried at room temperature, so that an intermediate layer with a thickness of 0.3 μm was provided on the aluminum plate.
(Formation of charge generation layer)

A coating liquid for a charge generation layer was prepared by pulverizing and dispersing a bisazo compound of the following formula, serving as a charge generation material, in a mixed solvent of cyclohexanone and methyl ethyl ketone using a ball mill. The thus obtained coating liquid was coated on the above prepared intermediate layer by a doctor blade, and dried at room temperature. Thus, a charge generation layer with a thickness of 0.5 μm was formed on the intermediate layer.

Bisazo Compound

|  | Parts by Weight |
|---|---|
| Low-molecular weight charge transport material of the following formula: | 0.47 |
| Polycarbonate resin No. 4 (synthesized in Preparation Example 4) | 0.53 |
| Dichloromethane | 5.7 |

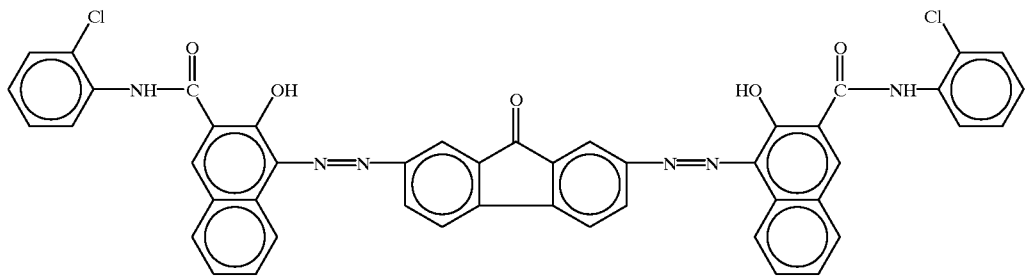

(Formation of charge transport layer)

The aromatic polycarbonate resin No. 1 of the present invention prepared in Preparation Example 1, serving as a charge transport material, was dissolved in dichloromethane. The thus obtained coating liquid was coated on the above prepared charge generation layer by a doctor blade, and dried at room temperature and then at 120° C. for 20 minutes, so that a charge transport layer with a thickness of 20 μm was provided on the charge generation layer.

Thus, an electrophotographic photoconductor No. 1 according to the present invention was fabricated.

EXAMPLES 2 AND 3

The procedure for fabrication of the electrophotographic photoconductor No. 1 in Example 1 was repeated except that the aromatic polycarbonate resin No. 1 for use in the charge transport layer coating liquid in Example 1 was replaced by the aromatic polycarbonate resins No. 2 and No. 3, respectively in Examples 2 and 3.

Thus, electrophotographic photoconductors No. 2 and No. 3 according to the present invention were fabricated.

EXAMPLE 4

The intermediate layer and the charge generation layer were successively overlaid on the aluminum plate in the same manner as in Example 1.

The following components were mixed to prepare a coating liquid for a charge transport layer:

The thus prepared charge transport layer coating liquid was coated on the above prepared charge generation layer by a doctor blade, and dried at room temperature and then at 120° C. for 20 minutes, so that a charge transport layer with a thickness of 20 μm was provided on the charge generation layer.

Thus, an electrophotographic photoconductor No. 4 according to the present invention was fabricated.

Each of the electrophotographic photoconductors No. 1 to No. 4 according to the present invention fabricated in Examples 1 to 4 was charged negatively in the dark under application of −6 kV of corona charge for 20 seconds, using a commercially available electrostatic copying sheet testing apparatus ("Paper Analyzer Model SP-428" made by Kawaguchi Electro Works Co., Ltd.). The surface potential (Vm) of each photoconductor was measured.

Then, each electrophotographic photoconductor was allowed to stand in the dark for 20 seconds without applying any charge thereto, and the surface potential (Vo) of the photoconductor was measured.

Each photoconductor was then illuminated by a tungsten lamp in such a manner that the illuminance on the illuminated surface of the photoconductor was 4.5 lux, and the exposure $E_{1/2}$ (lux·sec) required to reduce the initial surface potential Vo (V) to ½ the initial surface potential Vo (V) was measured.

The results are shown in TABLE 2.

TABLE 2

| Example No. | Polycarbonate Resin No. | −Vm (V) | −Vo (V) | E½ (lux·sec) |
|---|---|---|---|---|
| 1 | No. 1 | −1322 | −1183 | 1.34 |
| 2 | No. 2 | −1082 | −904 | 0.79 |
| 3 | No. 3 | −1313 | −1097 | 1.35 |
| 4 | No. 4 | −1485 | −1322 | 1.08 |

Comparative Example 1

The procedure for fabrication of the electrophotograpic photoconductor No. 1 in Example 1 was repeated except that the aromatic polycarbonate resin No. 1 for use in the charge transport layer coating liquid in Example 1 was replaced by an aromatic polycarbonate resin (described in Japanese Laid-Open Patent Application 9-297419) represented by the following formula:

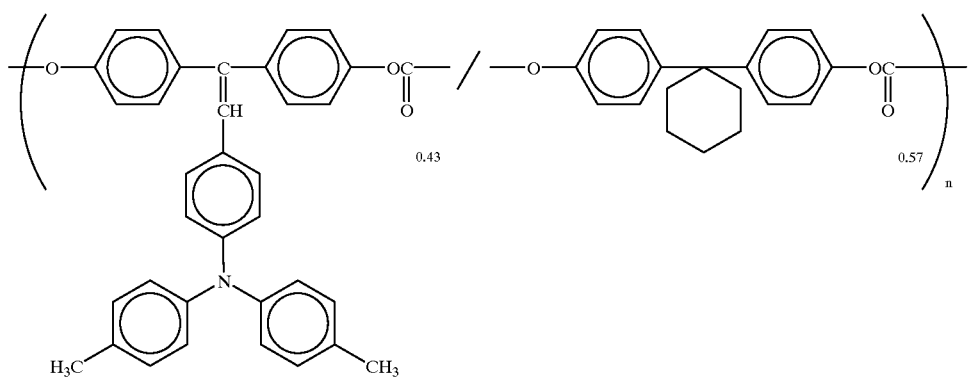

The weight-average molecular weight and the number-average molecular weight of the above-mentioned aromatic polycarbonate resin were respectively 627,000 and 106,000.

Thus, a comparative electrophotographic photoconductor No. 1 was fabricated.

Comparative Example 2

The procedure for fabrication of the electrophotographic photoconductor No. 1 in Example 1 was repeated except that the aromatic polycarbonate resin No. 1 for use in the charge transport layer coating liquid in Example 1 was replaced by an aromatic polycarbonate resin (described in Japanese Laid-Open Patent Application 9-297419) represented by the following formula:

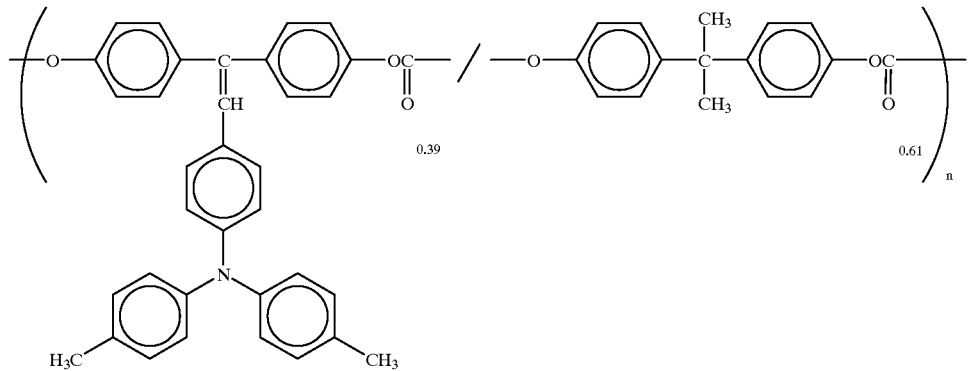

The weight-average molecular weight and the number-average molecular weight of the above-mentioned aromatic polycarbonate resin were respectively 207,900 and 83,600.

Thus, a comparative electrophotographic photoconductor No. 2 was fabricated.

The electrophotographic photoconductors Nos. 1 to 3 according to the present invention fabricated in Examples 1 to 3 and the comparative electrophotographic photoconductors Nos. 1 and 2 fabricated in Comparative Examples 1 and 2 were subjected to an abrasion test, using a commercially available Taber abrader with truck wheels (CS-5), made by Toyo Seiki Seisaku-sho, Ltd.

The abrasion amount of each photoconductor was measured under the application of a load of 1 kg after 3000 rotations.

The results are shown in TABLE 3.

TABLE 3

| Example No. | Abrasion Amount (mg) |
| --- | --- |
| Example 1 | 0.71 |
| Example 2 | 1.80 |
| Example 3 | 1.15 |
| Comparative Example 1 | 5.20 |
| Comparative Example 2 | 4.30 |

The abrasion resistance of the aromatic polycarbonate resins according to the present invention is considered to be superior to that of the conventional high-molecular weight charge transport materials when the results of Examples 1 to 3 are compared with those of Comparative Examples 1 and 2. Consequently, the photoconductors of the present invention show high durability.

Comparative Example 3

The procedure for fabrication of the electrophotographic photoconductor No. 4 in Example 4 was repeated except that the aromatic polycarbonate resin No. 4 for use in the charge transport layer coating liquid in Example 4 was replaced by a Z type polycarbonate resin (having a viscosity-average molecular weight of about 50,000).

Thus, a comparative electrophotographic photoconductor No. 3 was fabricated.

The electrophotographic photoconductor No. 4 according to the present invention fabricated in Example 4 and the comparative electrophotographic photoconductor No. 3 fabricated in Comparative Example 3 were similarly subjected to the above-mentioned abrasion test.

The results are shown in TABLE 4.

TABLE 4

| Example No. | Abrasion Amount (mg) |
| --- | --- |
| Example 4 | 4.34 |
| Comparative Example 3 | 5.05 |

When the abrasion resistance of the photoconductor of Example 4 is compared with that of the photoconductor of Comparative Example 3, it is found that the photoconductor No. 4 according to the present invention is superior to the comparative photoconductor No. 3 employing the conventional Z-type polycarbonate resin.

Further, each of the electrophotographic photoconductors No. 1 to No. 4 according to the present invention was set in a commercially available electrophotographic copying machine, and the photoconductor was charged and exposed to light images via original images to form latent electrostatic images thereon. Then, the latent electrostatic images formed on the photoconductor were developed into visible toner images by a dry developer, and the visible toner images were transferred to a sheet of plain paper and fixed thereon. As a result, clear toner images were obtained on the paper. When a wet developer was employed for the image formation, clear images were formed on the paper similarly.

As previously explained, the previously mentioned novel polycarbonate resins, for example, comprising the structural unit of formula (1) and the structural unit of formula (2), according to the present invention can provide polymeric materials with minimum mechanical abrasion. In addition, these polycarbonate resins can effectively function as photoconductive materials in the electrophotographic photoconductor. Such polycarbonate resins are optically or chemically sensitized with a sensitizer such as a dye or a Lewis acid. These resin compounds are preferably employed as charge transport materials in a photoconductive layer of the electrophotographic photoconductor, in particular, of a function-separating type electrophotographic photoconductor comprising a charge generation layer and a charge transport layer because these polycarbonate resins are provided with high charge transporting properties and high mechanical strength.

The polycarbonate resin for use in the photoconductive layer of the electrophotographic photoconductor according to the present invention comprises as an effective component at least the structural unit of formula (1). Further, the aromatic polycarbonate resin used in the photoconductive layer comprises the structural unit of formula (1) and a structural unit having charge transporting properties. Furthermore, a polycarbonate resin in the form of a random copolymer comprising the structural unit of formula (1) and the structural unit of formula (2) or (4), and a polycarbonate resin in the form of an alternating copolymer comprising the repeat unit of formula (3) or (5) are employed in the electrophotographic photoconductors of the present invention.

In any case, the polycarbonate resin for use in the present invention comprises at least the structural unit of formula (1), so that a polymeric material with minimum mechanical abrasion can be provided. When the above-mentioned polycarbonate resin is employed in the photoconductive layer of the electrophotographic photoconductor, the abrasion resistance of the photoconductor is remarkably improved. In particular, the polycarbonate resin in the form of a copolymer resin comprising the structural unit of formula (1) and the structural unit having charge transporting properties has excellent mechanical strength, so that the obtained photoconductor can exhibit high sensitivity and high durability.

Japanese Patent Application No. 10-209554 filed Jul. 24, 1998 and Japanese Patent Application No. 10-212637 filed Jul. 28, 1998 are hereby incorporated by reference.

What is claimed is:

1. An aromatic polycarbonate resin comprising a structural unit of formula (1) and a structural unit of formula (2), with the relationship between the composition ratios being $0<k/(k+j)<1$ when the composition ratio of said structural unit of formula (1) is j and that of said structural unit of formula (2) is

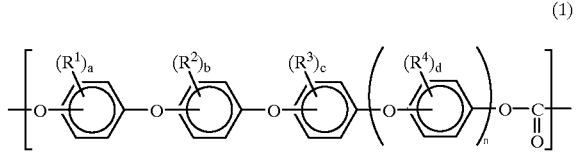
(1)

wherein a, b, c and d are each independently an integer of 0 to 4; n is an integer of 0 or 1; and $R^1$, $R^2$, $R^3$ and $R^4$ are each independently a halogen atom, an alkyl group having 1 to 6 carbon atoms, which may have a substituent, an alkoxyl group having 1 to 6 carbon atoms, which may have a substituent, or an aryl group which may have a substituent, and $R^1$, $R^2$, $R^3$ and $R^4$ may each be the same or different when a, b, c and d are each an integer of 2, 3 or 4;

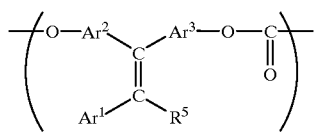
(2)

wherein $R^5$ is a hydrogen atom, an alkyl group which may have a substituent, or an aryl group which may have a substituent; $Ar^1$ is an aryl group which may have a substituent; and $Ar^2$ and $Ar^3$ are each an arylene group which may have a substituent.

2. An aromatic polycarbonate resin comprising a repeat unit of formula (3):

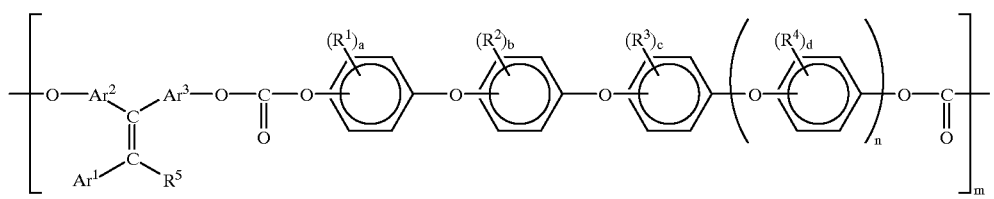
(3)

wherein a, b, c and d are each independently an integer of 0 to 4; n is an integer of 0 or 1; $R^1$, $R^2$, $R^3$ and $R^4$ are each independently a halogen atom, an alkyl group having 1 to 6 carbon atoms, which may have a substituent, an alkoxyl grop having 1 to 6 carbon atoms, which may have a substituent, or an aryl group which may have a substituent, and $R^1$, $R^2$, $R^3$ and $R^4$ may each be the same or different when a, b, c and d are each an integer of 2, 3 or 4; $R^5$ is a hydrogen atom, an alkyl group which may have a substituent, or an aryl group which may have a substituent;

$Ar^1$ is an aryl group which may have a substituent; $Ar^2$ and $Ar^3$ are each an arylene group which may have a substituent; and m is an integer of 2 to 5000, which represents a degree of polymerization.

3. An aromatic polycarbonate resin comprising a structural unit of formula (1) and a structural unit of formula (4), with the relationship between the composition ratios being 0<k/(k+j)<1 when the composition ratio of said structural unit of formula (1) is j and that of said structural unit of formula (4) is

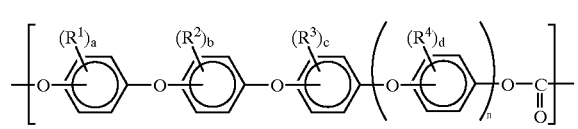
(1)

wherein a, b, c and d are each independently an integer of 0 to 4; n is an integer of 0 or 1; and $R^1$, $R^2$, $R^3$ and $R^4$ are each independently a halogen atom, an alkyl group having 1 to 6 carbon atoms, which may have a substituent, an alkoxyl group having 1 to 6 carbon atoms, which may have a substituent, or an aryl group which may have a substituent, and $R^1$, $R^2$, $R^3$ and $R^4$ may each be the same or different when a, b, c and d are each an integer of 2, 3 or 4;

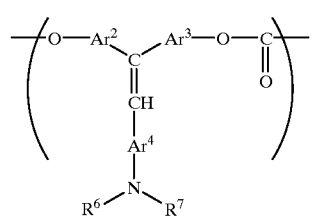
(4)

wherein $Ar^2$, $Ar^3$ and $Ar^4$ are each an arylene group which may have a substituent; and $R^6$ and $R^7$ which may be the same or different, are each an acyl group, an alkyl group which may have a substituent, or an aryl group which may have a substituent.

4. An aromatic polycarbonate resin comprising a repeat unit of formula (5):

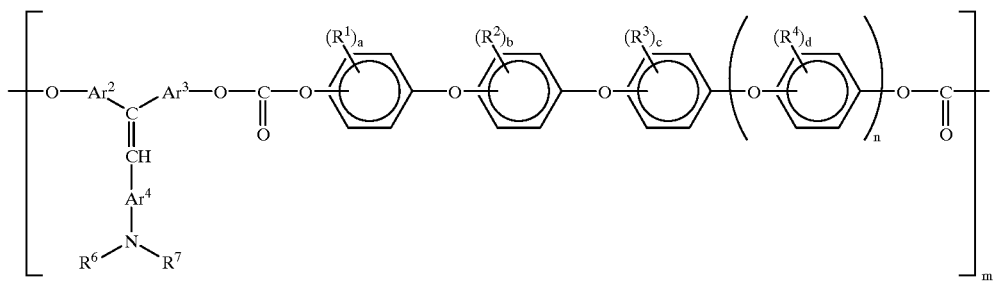
(5)

wherein a, b, c and d are each independently an integer of 0 to 4; n is an integer of 0 or 1; $R^1$, $R^2$, $R^3$ and $R^4$ are each independently a halogen atom, an alkyl group having 1 to 6 carbon atoms, which may have a substituent, an alkoxyl group having 1 to 6 carbon atoms, which may have a substituent, or an aryl group which may have a substituent, and $R^1$, $R^2$, $R^3$ and $R^4$ may each be the same or different when a, b, c and d are each an integer of 2, 3 or 4; $Ar^2$, $Ar^3$ and $Ar^4$ are each an arylene group which may have a substituent; $R^6$ and $R^7$ which may be the same or different, are each an acyl group, an alkyl group which may have a substituent, or an aryl group which may have a substituent; and m is an integer of 2 to 5000, which represents a degree of polymerization.

5. The aromatic polycarbonate resin as claimed in claim 3, wherein said structural unit of formula (4) is represented by formula (6):

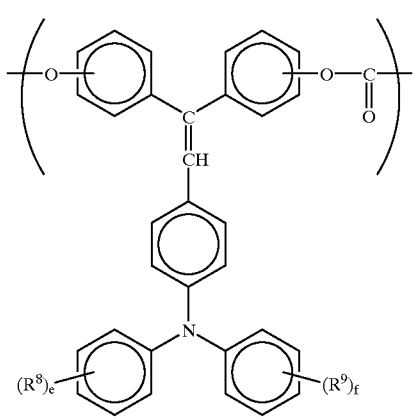
(6)

wherein e and f are each independently an integer of 0 to 5; and $R^8$ and $R^9$ are each independently a halogen atom, an alkyl group having 1 to 6 carbon atoms, which may have a substituent, an alkoxyl group having 1 to 6 carbon atoms, which may have a substituent, or an aryl group which may have a substituent, and $R^8$ and $R^9$ may each be the same or different when e and f are each an integer of 2, 3, 4 or 5.

6. The aromatic polycarbonate resin as claimed in claim 4, wherein said repeat unit of formula (5) is represented by formula (7):

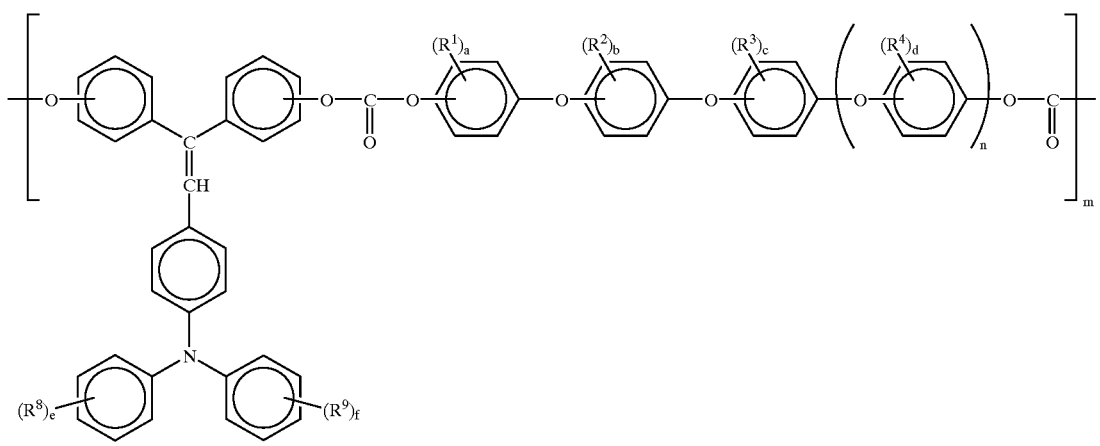
(7)

wherein a, b, c and d are each independently an integer of 0 to 4; n is an integer of 0 or 1; $R^1$, $R^2$, $R^3$ and $R^4$ are each independently a halogen atom, an alkyl group having 1 to 6 carbon atoms, which may have a substituent, an alkoxyl group having 1 to 6 carbon atoms, which may have a substituent, or an aryl group which may have a substituent, and $R^1$, $R^2$, $R^3$ and $R^4$ may each be the same or different when a, b, c and d are each an integer of 2, 3 or 4; e and f are each independently an integer of 0 to 5; $R^8$ and $R^9$ are each independently a halogen atom, an alkyl group having 1 to 6 carbon atoms, which may have a substituent, an alkoxyl group having 1 to 6 carbon atoms, which may have a substituent, or an aryl group which may have a substituent, and $R^8$ and $R^9$ may each be the same or different when e and f are each an integer of 2, 3, 4 or 5; and m is an integer of 2 to 5000, which represents a degree of polymerization.

* * * * *

UNITED STATES PATENT AND TRADEMARK OFFICE
CERTIFICATE OF CORRECTION

PATENT NO.    : 6,303,736 B1
DATED         : October 16, 2001
INVENTOR(S)   : Shinichi Kawamura et al.

It is certified that error appears in the above-identified patent and that said Letters Patent is hereby corrected as shown below:

<u>Column 3,</u>
Line 38, delete "OMe" and insert in its place -- O --.

<u>Column 5,</u>
Line 40, delete "OMe" and insert in its place -- O --.

<u>Column 7,</u>
Line 12, delete formula (6)

"
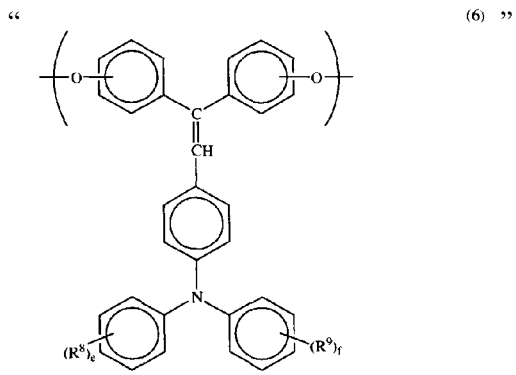
(6) "

and insert the following formula (6) --

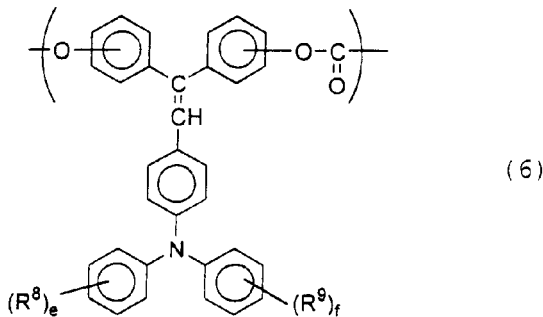

(6)

--.

Line 58, delete "$R_9$" and insert -- $R^9$ --.

<u>Column 15,</u>
Line 33, delete "p-isoprooenylphenol" and insert -- p-isoproenylphenol --.

UNITED STATES PATENT AND TRADEMARK OFFICE
CERTIFICATE OF CORRECTION

PATENT NO.    : 6,303,736 B1
DATED         : October 16, 2001
INVENTOR(S)   : Shinichi Kawamura et al.

It is certified that error appears in the above-identified patent and that said Letters Patent is hereby corrected as shown below:

Column 20,
Line 31, delete "$R^{13}$" and insert -- $R^{15}$ --.

Column 21,
Line 52, delete "3,3'-dihyhydroxydiphenylsulfone" and insert
-- 3,3'-dimethyl-4,4'-dihydroxydiphenylsulfone --.

Column 23,
Line 16, delete "seleceted" and insert -- selected --;
Line 54, delete "$R^3$" and insert -- $R^8$ --.

Column 28,
Line 45, "in" should read -- In --.

Column 44,
Line 67, should read -- formula (2) is k: --.

Column 46,
Line 9, should read -- formula (4) is k: --.

Signed and Sealed this

Eighth Day of October, 2002

*Attest:*

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO.    : 6,303,736 B1
DATED         : October 16, 2001
INVENTOR(S)   : Shinichi Kawamura et al.

It is certified that error appears in the above-identified patent and that said Letters Patent is hereby corrected as shown below:

<u>Column 15,</u>
Line 33, "p-isoproenylphenol" should read -- p-isopropenylphenol --

Signed and Sealed this

Thirteenth Day of May, 2003

JAMES E. ROGAN
*Director of the United States Patent and Trademark Office*